United States Patent
Li

(10) Patent No.: US 12,260,008 B2
(45) Date of Patent: Mar. 25, 2025

(54) HIDING CONTENT DISPLAYED BY AN APPLICATION BASED ON A USER SELECTION

(71) Applicant: Huawei Technologies Co., Ltd., Shenzhen (CN)

(72) Inventor: Haoran Li, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 634 days.

(21) Appl. No.: 17/298,392

(22) PCT Filed: Nov. 30, 2018

(86) PCT No.: PCT/CN2018/118726
§ 371 (c)(1),
(2) Date: May 28, 2021

(87) PCT Pub. No.: WO2020/107463
PCT Pub. Date: Jun. 4, 2020

(65) Prior Publication Data
US 2021/0397752 A1     Dec. 23, 2021

(51) Int. Cl.
| G06F 3/00 | (2006.01) |
| G06F 3/0482 | (2013.01) |
| G06F 3/04842 | (2022.01) |
| G06F 3/04847 | (2022.01) |
| G06F 21/31 | (2013.01) |
| G06F 21/84 | (2013.01) |

(52) U.S. Cl.
CPC ............ *G06F 21/84* (2013.01); *G06F 3/0482* (2013.01); *G06F 3/04842* (2013.01); *G06F 3/04847* (2013.01); *G06F 21/31* (2013.01)

(58) Field of Classification Search
CPC ............... G06F 3/0482; G06F 3/04842; G06F 3/04847; G06F 21/31; G06F 21/84
See application file for complete search history.

(56) References Cited

U.S. PATENT DOCUMENTS

| 11,763,389 B2 * | 9/2023 | Matsunaga ............ G06Q 30/04 705/4 |
| 2006/0271281 A1 * | 11/2006 | Ahn ........................ G01C 21/26 701/532 |
| 2008/0148182 A1 * | 6/2008 | Chiang ................. G06F 3/0482 715/810 |

(Continued)

FOREIGN PATENT DOCUMENTS

| CN | 103186331 A | 7/2013 |
| CN | 104679387 A | 6/2015 |

(Continued)

*Primary Examiner* — Brett A Feeney
*Assistant Examiner* — Andrew Chung
(74) *Attorney, Agent, or Firm* — Conley Rose, P.C.

(57) ABSTRACT

A method includes displaying, by an electronic device, a first page, enabling, by the electronic device, a page content hiding function for the first page in response to a first preset input of a user, receiving, by the electronic device, a second preset input of marking a hidden area on the first page by the user after enabling the page content hiding function, and hiding, by the electronic device, display content in the hidden area in response to the second preset input.

20 Claims, 27 Drawing Sheets

(56) References Cited

U.S. PATENT DOCUMENTS

| | | | |
|---|---|---|---|
| 2009/0288026 A1* | 11/2009 | Barabas | G06F 16/10 |
| | | | 715/764 |
| 2014/0362015 A1 | 12/2014 | Ma | |
| 2015/0294096 A1* | 10/2015 | Grigg | H04L 63/08 |
| | | | 726/5 |
| 2015/0332439 A1 | 11/2015 | Zhang et al. | |
| 2016/0019223 A1* | 1/2016 | Kisielius | G06F 16/444 |
| | | | 715/849 |
| 2018/0081529 A1 | 3/2018 | Zhang et al. | |
| 2018/0144178 A1 | 5/2018 | Han et al. | |
| 2018/0225478 A1* | 8/2018 | DeLuca | G06F 21/316 |
| 2018/0348955 A1* | 12/2018 | Gao | G06F 3/0412 |
| 2020/0142554 A1* | 5/2020 | Lin | G06F 3/0482 |

FOREIGN PATENT DOCUMENTS

| | | |
|---|---|---|
| CN | 105678180 A | 6/2016 |
| CN | 106485173 A | 3/2017 |
| CN | 106569689 A | 4/2017 |
| CN | 107025410 A | 8/2017 |
| CN | 107679377 A | 2/2018 |
| CN | 108345775 A | 7/2018 |

\* cited by examiner

HIDING CONTENT DISPLAYED BY AN APPLICATION BASED ON A USER SELECTION

CROSS-REFERENCE TO RELATED APPLICATIONS

This application is a U.S. National Stage of International Patent Application No. PCT/CN2018/118726 filed Nov. 30, 2018, which is incorporated by reference herein in its entirety.

TECHNICAL FIELD

This application relates to the field of terminal technologies, and in particular, to an electronic device control method and an electronic device.

BACKGROUND

Currently, an increasing amount of user privacy is stored in an electronic device such as a mobile phone, and a user attaches increasingly high importance to protection of privacy content in the electronic device. A mobile phone is used as an example. To protect privacy content of a user in the mobile phone, some mobile phone manufacturers set an encrypted storage space in the mobile phone, and the user may store some privacy content such as a photo, an SMS message, or an application in the encrypted storage space by using an encryption password. In this way, only an authorized user who correctly enters the encryption password can view the privacy content in the encrypted storage space in the mobile phone.

However, a requirement of a user for protecting privacy content generally changes dynamically in an actual use process. For example, when listening to a song by using a music app, the user may not want another user to view information such as a song name on a page, or when having a chat by using a chat app, the user may not want another user to view some chat messages on a page. Therefore, how to dynamically hide privacy content of a user on a page in a use process becomes an urgent problem to be resolved.

SUMMARY

This application provides an electronic device control method and an electronic device, so as to dynamically hide some display content on a page based on a requirement of a user in a use process, thereby avoiding disclosure of privacy content of the user.

To achieve the foregoing objectives, the following technical solutions are used in this application.

According to a first aspect, an embodiment of this application provides an electronic device control method. The method includes: An electronic device displays a first page. The electronic device enables a page content hiding function for the first page in response to a first preset input of a user. The electronic device may receive, after enabling the page content hiding function, a second preset input of marking a hidden area on the first page by the user. The elect device may hide display content in the hidden area in response to the second preset input.

That is, when the first page is displayed, the user may manually set, based on a requirement of the user, a hidden area that needs to be hidden on the first page, so that the electronic device can hide display content in the hidden area based on the setting of the user. In this way, when a mobile phone displays the first page, the display content in the hidden area that is set by the user is not exposed to another user. In a public place, the user may use the foregoing method to hide some sensitive areas on a display page based on a requirement of the user, thereby avoiding disclosure of privacy content of the user.

In a possible design method, before the electronic device receives, after enabling the page content hiding function, the second preset input of marking a hidden area on the first page by the user, the method further includes: The electronic device prompts the user to mark an area that needs to be hidden on the first page. For example, the electronic device may prompt, in a manner such as displaying a mark box or a toolbar, the user to mark the area that needs to be hidden.

In a possible design method, after the electronic device receives the second preset input of marking a hidden area on the first page by the user, and before the electronic device hides the display content in the hidden area, the method further includes: The electronic device prompts the user to select a hiding manner of the display content in the hidden area, where the hiding manner includes at least one of blurring, mosaic, graffiti, and clearing. Further, the electronic device may receive the hiding manner selected by the user. Subsequently, the electronic device may hide the display content in the hidden area on the first page in the hiding manner selected by the user. For example, the electronic device may modify a pixel value of each pixel in the hidden area by using an algorithm corresponding to the hiding manner selected by the user. In this way, the electronic device may hide the display content in the hidden area in the hiding manner that is set by the user, so that the user can customize experience of using a hiding function.

In a possible design method, that an electronic device displays a first page includes: The electronic device displays the first page, and obtains display data on the first page, where the display data includes a pixel value of each pixel on the first page. Subsequently, that the electronic device hides display content in the hidden area specifically includes: The electronic device modifies display data in the hidden area, so that the display content in the hidden area is hidden.

For example, that the electronic device obtains display data on the first page specifically includes: A page editing service at an application framework layer may invoke a screenshot interface provided by a drawing service to take a screenshot of the first page that is being displayed, where a pixel value of each pixel in the screenshot is the display data on the first page.

In a possible design method, that the electronic device prompts the user to mark an area that needs to be hidden on the first page includes: The electronic device displays a mark box on the first page, where the mark box is used to mark the area that needs to be hidden, where the second preset input of marking a hidden area on the first page by the user is an operation of adjusting/determining a size and/or a location of the mark box on the first page by the user.

In a possible design method, that the electronic device prompts the user to mark an area that needs to be hidden on the first page includes: The electronic device displays a toolbar on the first page, where the toolbar includes at least one tool button, where the second preset input of marking a hidden area on the first page by the user is an operation of marking the hidden area on the first page by the user by using the tool button.

In a possible design method, the first page further includes an invert button. In this case, that the electronic device receives a second preset input of marking a hidden area on the first page by the user includes: The electronic device receives a third preset input of marking a non-hidden area on the first page by the user. If it is detected that the invert button is selected, the electronic device determines an area other than the non-hidden area on the first page as the hidden area. When an area that the user wants to hide is an irregular graph, the invert button may help the user more conveniently select the area that needs to be hidden on the first page.

In a possible design method, after the electronic device hides the display content in the hidden area, the method further includes: The electronic device receives identity authentication information entered by the user. If the identity authentication information entered by the user is correct, it indicates that the user who currently operates the electronic device is an authorized user, and the electronic device redisplays the content in the hidden area on the first page, that is, disables the hiding function for the first page.

In a possible design method, after the electronic device hides the display content in the hidden area, the method further includes: The electronic device prompts the user to select an operation that needs to be locked on the first page. Further, the electronic device may receive a setting of locking a first operation on the first page by the user. If it is detected that the user performs the first operation on the first page, the electronic device prompts the user to enter identity authentication information. The electronic device receives the identity authentication information entered by the user. If the identity authentication information entered by the user is correct, the electronic device executes a response event corresponding to the first operation; or if the identity authentication information entered by the user is incorrect, the electronic device skips responding to the first operation.

According to a second aspect, an embodiment of this application provides an electronic device control method, including: An electronic device displays a first page. If a fourth preset input of a user is detected when the first page is displayed, the electronic device enables a page operation locking function for the first page. The electronic device may receive, after enabling the page operation locking function, a setting of locking a first operation on the first page by the user. In this case, the user does not lock a second operation on the first page. Subsequently, if it is detected that the user performs the first operation on the first page, because the first operation has been locked, the electronic device may prompt the user to enter identity authentication information. The electronic device receives the identity authentication information entered by the user. If the identity authentication information entered by the user is correct, the electronic device executes a response event corresponding to the first operation. Correspondingly, if it is detected that the user performs the second operation on the first page, because the second operation is not locked, the electronic device may execute a response event corresponding to the second operation.

That is, when the first page is displayed, the user may manually lock some operations on the first page based on a requirement of the user. In this way, when the user needs to display the first page to another user, the user may customize a lock operation on the first display page according to the foregoing method. In this case, the another user cannot perform, on the display page, the lock operation that is set by the user, thereby preventing information in the mobile phone from being obtained by an unauthorized user.

In a possible design method, before the electronic device receives, after enabling the page operation locking function, a setting of locking a first operation on the first page by the user, the method further includes: The electronic device prompts the user to select an operation that needs to be locked on the first page.

For example, the first operation may include at least one of a slide operation (for example, a left slide operation, a right slide operation, an up slide operation, or a down slide operation), a press operation, a return operation, and a tap operation.

In a possible design method, after the electronic device receives the identity authentication information entered by the user, the method further includes: If the identity authentication information entered by the user is incorrect, it indicates that the user who operates the electronic device is an unauthorized user, and the electronic device skips responding to the first operation.

In a possible design method, after the electronic device receives the setting of locking a first operation on the first page by the user, the method further includes: The electronic device may prompt the user to mark an area that needs to be hidden on the first page. Further, if the electronic device receives a second preset input of marking a hidden area on the first page by the user, the electronic device may hide display content in the hidden area in response to the second preset input.

According to a third aspect, this application provides an electronic device, including one or more processors, one or more memories, an input device, an output device, and one or more computer programs. The processor is coupled to the memory, the input device, and the output device. The one or more computer programs are stored in the memory. When the electronic device runs, the processor executes the one or more computer programs stored in the memory, so that the electronic device performs the electronic device control method in the first aspect or the second aspect.

According to a fourth aspect, this application provides a computer storage medium, including computer instructions. When the computer instructions are run on an electronic device, the electronic device is enabled to perform the electronic device control method in the first aspect.

According to a fifth aspect, this application provides a computer program product. When the computer program product is run on an electronic device, the electronic device is enabled to perform the electronic device control method in the first aspect.

It may be understood that, the electronic device in the third aspect, the computer storage medium in the fourth aspect, and the computer program product in the fifth aspect that are provided above are all configured to perform the corresponding method provided above. Therefore, for beneficial effects that can be achieved by the electronic device, the computer storage medium, and the computer program product, refer to beneficial effects in the corresponding method provided above, Details are not described again herein.

DESCRIPTION OF EMBODIMENTS

The following describes implementations of the embodiments in detail with reference to the accompanying drawings.

An electronic device control method provided in the embodiments of this application may be applied to an electronic device having a display function, such as a mobile phone, a tablet computer, a desktop computer, a laptop computer, an ultra-mobile personal computer (ultra-mobile personal computer, UMPC), a handheld computer, a netbook, a personal digital assistant (personal digital assistant, PDA), a wearable electronic device, or a virtual reality device. This is not limited in the embodiments of this application.

Figure 1:
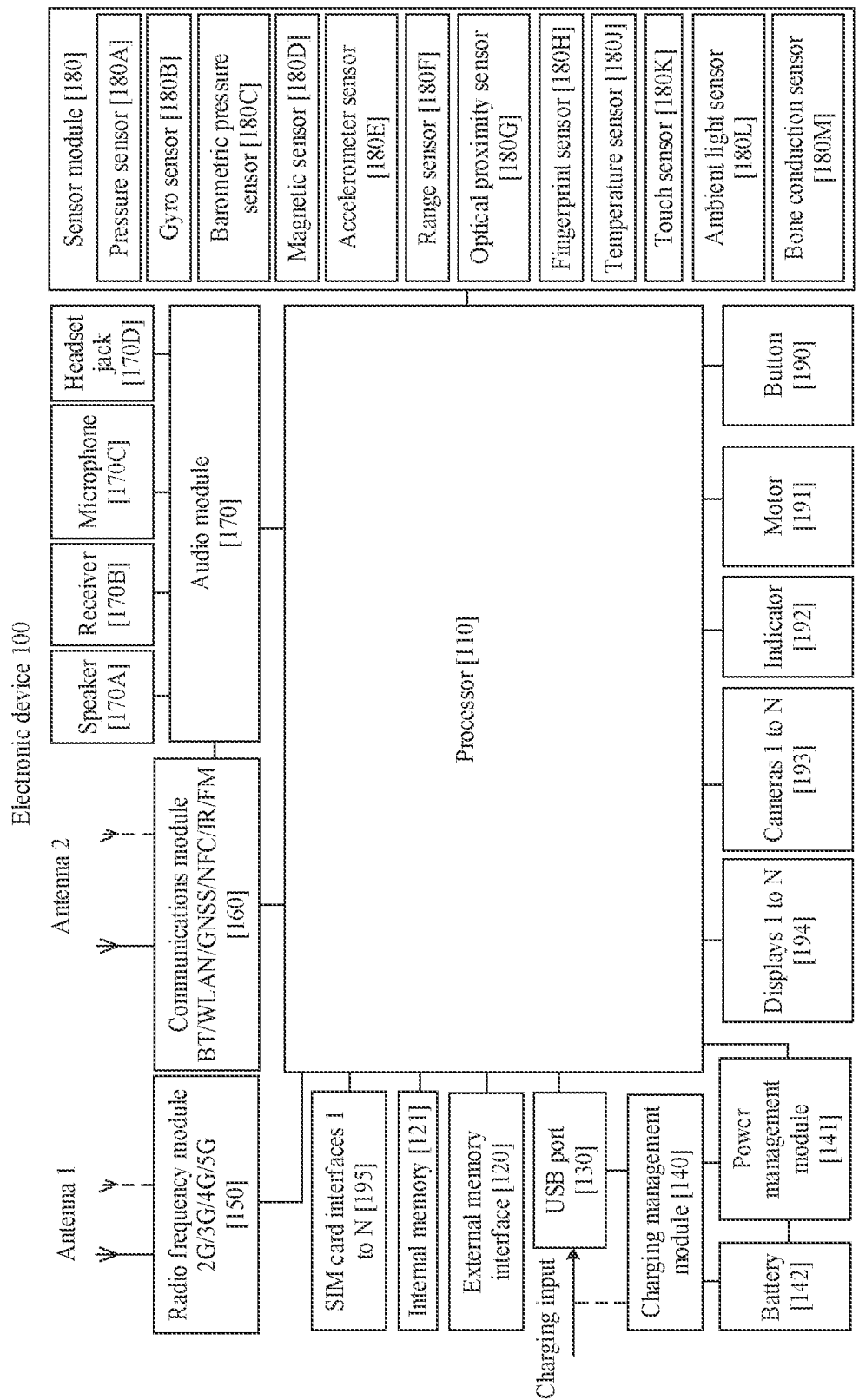
FIG. 1 is a first schematic structural diagram of an electronic device according to an embodiment of this application.

For example, FIG. 1 is a schematic structural diagram of an electronic device 100.

The electronic device 100 may include a processor 110, an external memory interface 120, an internal memory 121, a universal serial bus (universal serial bus, USB) port 130, a charging management module 140, a power management module 141, a battery 142, an antenna 1, an antenna 2, a mobile communications module 150, a wireless communications module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (subscriber identification module, SIM) card interface 195, and the like. The sensor module 180 may include a pressure sensor 180A, a gyro sensor 180B, a barometric pressure sensor 180O, a magnetic sensor 180D, an acceleration sensor 180E, a range sensor 180F, an optical proximity sensor 180G, a fingerprint sensor 180I1, a temperature sensor 180J, a touch sensor 180K, an ambient light sensor 180L, a bone conduction sensor 180M, and the like.

It may be understood that the structure shown in the embodiments of this application does not constitute a specific limitation on the electronic device 100. In some other embodiments of this application, the electronic device 100 may include more or fewer components than those shown in the figure, or some components may be combined, or some components may be split, or different component arrangements may be used. The components shown in the figure may be implemented by hardware, software, or a combination of software and hardware.

The processor 110 may include one or more processing units. For example, the processor 110 may include an application processor (application processor, AP), a modem processor, a graphics processing unit (graphics processing unit, GPU), an image signal processor (image signal processor, ISP), a controller, a memory, a video codec, a digital signal processor (digital signal processor, DSP), a baseband processor, and/or a neural processing unit (neural-network processing unit, NPU). Different processing units may be independent components, or may be integrated into one or more processors.

The controller may be a nerve center and a command center of the electronic device 100. The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache memory. The memory may store instructions or data just used or cyclically used by the processor 110. If the processor 110 needs to use the instructions or the data again, the processor 110 may directly invoke the instructions or the data from the memory, to avoid repeated access and reduce a waiting time of the processor 110, thereby improving system efficiency.

In some embodiments, the processor 110 may include one or more interfaces. The interface may include an inter-integrated circuit (inter-integrated circuit, I2C) interface, an inter-integrated circuit sound (inter-integrated circuit sound, I2S) interface, a pulse code modulation (pulse code modulation, PCM) interface, a universal asynchronous receiver/transmitter (universal asynchronous receiver/transmitter, UART) interface, a mobile industry processor interface (mobile industry processor interface. MIPI), a general-purpose input/output (general-purpose input/output, GPIO) interface, a subscriber identity module (subscriber identity module, SIM) interface, a universal serial bus (universal serial bus, USB) port, and/or the like.

The I2C interface is a two-way synchronization serial bus, and includes one serial data line (serial data line, SDA) and one serial clock line (derail clock line, SCL). In some embodiments, the processor 110 may include a plurality of groups of I2C buses. The processor 110 may be separately coupled to the touch sensor 180K, a charger, a flash light, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the electronic device 100.

The I2S interface may be configured to perform audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communications module 160 through the I2S interface, to implement a function of answering a call through a Bluetooth headset.

The PCM interface may also be configured to: perform audio communication, and sample, quantize, and code an analog signal. In some embodiments, the audio module 170 may be coupled to the wireless communications module 160 through the PCM bus interface. In some embodiments, the audio module 170 may alternatively transmit an audio signal to the wireless communications module 160 through the PCM interface, to implement a function of answering a call through a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 110 to the wireless communications module 160. For example, the processor 110 communicates with a Bluetooth module in the wireless communications module 160 through the UART interface, to implement a Bluetooth function. In some embodiments, the audio module 170 may transmit an audio signal to the wireless communications module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (camera serial interface, CSI), a display serial interface (display serial interface, DSI), and the like. In some embodiments, the processor 110 communicates with the camera 193 through the CSI interface, to implement a shooting function of the electronic device 100. The processor 110 communicates with the display 194 through the DSI interface, to implement a display function of the electronic device 100.

The GPIO interface may be configured by using software. The GPIO interface may be configured as a control signal or a data signal. In some embodiments, the GPIO interface may be configured to connect the processor 110 to the camera 193, the display 194, the wireless communications module 160, the audio module 170, the sensor module 180, and the like. The GPIO interface may alternatively be configured as the I2C interface, the I2S interface, the UART interface, the MIPI interface, or the like.

The USB port 130 is a port that conforms to a USB standard specification, and may be specifically a mini USB port, a micro USB port, a. USB Type C port, or the like. The USB port 130 may be configured to connect to the charger to charge the electronic device 100, or may be configured to transmit data between the electronic device 100 and a peripheral device, or may be configured to connect to a headset to play audio through the headset, or may be configured to connect to another electronic device such as an AR device.

It can be understood that an interface connection relationship between the modules shown in the embodiments of this application is merely an example for description, and does not constitute a limitation on the structure of the electronic device 100. In some other embodiments of this application, the electronic device 100 may alternatively use an interface connection manner that is different from that in the foregoing embodiment, or a combination of a plurality of interface connection manners.

The charging, management module 140 is configured to receive a charging input from the charger. The charger may be a wireless charger or a wired charger. In some embodiments of wired charging, the charging management module 140 may receive a charging input of a wired charger through the USB port. In some embodiments of wireless charging, the charging management module 140 may receive a wireless charging input through a wireless charging coil of the electronic device 100. The charging management module 140 may further supply power to the electronic device through the power management module 141 while charging the battery 142.

The power management module 141 is configured to connect to the battery 142, the charging management module 140, and the processor 110. The power management module 141 receives an input of the battery 142 and/or the charging management module 140, and supplies power to the processor 110, the internal memory 121, an external memory, the display 194, the camera 193, the wireless communications module 160, and the like. The power management module 141 may be further configured to monitor parameters such as a battery capacity, a battery cycle count, and a battery health status (electric leakage or impedance). In some other embodiments, the power management module 141 may alternatively be disposed in the processor 110. In some other embodiments, the power management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to transmit and receive an electromagnetic wave signal. Each antenna in the electronic device 100 may be configured to cover one or more communication bands. Different antennas may be further multiplexed, to increase antenna utilization. For example, the antenna 1 may be multiplexed as a diversity antenna of a wireless local area network. In some other embodiments, the antenna may be used in combination with a tuning switch.

The mobile communications module 150 can provide a solution, applied to the electronic device 100, to wireless communication including 2G/3G/4G/5G, and the like. The mobile communications module 150 may include at least one filter, a switch, a power amplifier, a low noise amplifier (low noise amplifier, LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert an amplified signal into an electromagnetic wave through the antenna 1 for radiation. In some embodiments, at least some function modules in the mobile communications module 150 may be disposed in the processor 110. In some embodiments, at least some function modules in the mobile communications module 150 may be disposed in a same device as at least some modules in the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor and then transmitted to the application processor. The application processor outputs a sound signal through an audio device (not limited to the speaker 170A, the receiver 170B, or the like), or displays an image or a video through the display 194. In some embodiments, the modem processor may be an independent device. In some other embodiments, the modem processor may be independent of the processor 110, and is disposed in a same device as the mobile communications module 150 or another function module.

The wireless communications module 160 may provide a solution, applied to the electronic device 100, to wireless communication including a wireless local area network (wireless local area networks, WLAN) (for example, a wireless fidelity (wireless fidelity, Wi-Fi) network), Bluetooth (bluetooth, BT), a global navigational satellite system (global navigation satellite system, GNSS), frequency modulation (frequency modulation, FM), near field communication (near field communication, NFC), an infrared (infrared, IR) technology, and the like. The wireless communications module 160 may be one or more devices integrating at least one communication processing module. The wireless communications module 160 receives an electromagnetic wave through the antenna 2, performs frequency modulation and filtering processing on an electromagnetic wave signal, and sends a processed signal to the processor 110. The wireless communications module 160 may further receive a to-be-sent signal from the processor 110, perform frequency modulation and amplification on the signal, and convert a processed signal into an electromagnetic wave through the antenna 2 for radiation.

In some embodiments, in the electronic device 100, the antenna 1 is coupled to the mobile communications module 150, and the antenna 2 is coupled to the wireless communications module 160, so that the electronic device 100 can communicate with a network and another device by using a wireless communications technology. The wireless communications technology may include a global system for mobile communications global system for mobile communications, GSM), a general packet radio service (general packet radio service, GPRS), code division multiple access (ode division multiple access, CDMA), wideband code division multiple access (wideband code division multiple access, WCDMA), time division-code division multiple access time-division code division multiple access, TD-SCDMA), long term evolution (long term evolution, LTE), BT, the GNSS, the WLAN, the NFC, the FM, the IR technology, and/or the like. The GNSS may include a global positioning system (global positioning system, GPS), a global navigation satellite system (global navigation satellite system, GLONASS), a BeiDou navigation satellite system (beidou navigation satellite system, BDS), a quasi-zenith satellite system (quasi-zenith satellite system, QZSS), and/or a satellite-based augmentation system (satellite based augmentation systems, SBAS).

The electronic device 100 implements a display function through the GPU, the display 194, the application processor, and the like. The GPU is a microprocessor for image processing, and connects the display 194 to the application processor. The GPU is configured to: perform mathematical and geometric calculation, and render an image. The processor 110 may include one or more GPUs that execute program instructions to generate or change display information.

The display 194 is configured to display an image, a video, and the like. The display 194 includes a display panel. The display panel may be a liquid crystal display (liquid crystal display, LCD), an organic light-emitting diode (organic light-emitting diode, OLED), an active-matrix organic light emitting diode (active-matrix organic light emitting diode, AMOLED), a flexible light-emitting diode (flex light-emitting diode, FLED), mini-LED, a micro-LED, a micro-OLED, a quantum dot light emitting diode (quantum dot light emitting diodes, QLED), or the like. In some embodiments, the electronic device 100 may include one or N displays, where N is a positive integer greater than 1.

The electronic device 100 may implement a photographing function through the ISP, the camera 193, the video codec, the GPU, the display 194, the application processor, and the like.

The ISP is configured to process data fed back by the camera 193, For example, during photographing, a shutter is pressed, light is transmitted to a photosensitive element of the camera through a lens, and an optical signal is converted into an electrical signal. The photosensitive element of the camera transmits the electrical signal to the ISP for processing, namely, converting the electrical signal into a visible image. The ISP may further perform algorithm optimization on noise, brightness, and complexion of the image. The ISP may further optimize parameters such as exposure and color temperature of a photographing scenario. In some embodiments, the ISP may be disposed in the camera 193.

The camera 193 is configured to capture a static image or a video. An optical image of an object is generated by using the lens, and is projected onto the photosensitive element. The light-sensitive element may be a charge coupled device (charge coupled device, CCD) or a complementary metal-oxide-semiconductor (complementary metal-oxide-semiconductor, CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as an RGB format or a YUV format. In some embodiments, the electronic device 100 may include one or N cameras 193, where N is a positive integer greater than 1.

The digital signal processor is configured to process a digital signal, and may process other digital signals in addition to the digital image signal. For example, when the electronic device 100 selects a frequency, the digital signal processor is configured to perform Fourier transformation and the like on frequency energy.

The video codec is configured to compress or decompress a digital video. The electronic device 100 may support one or more video codecs. Therefore, the electronic device 100 may play or record videos in a plurality of coding formats, for example, MPEG (moving picture experts group, MPEG)-1, MPEG-2, MPEG-3, and MPEG-4.

The NPU is a neural-network (neural-network, NN) computing processor, quickly processes input information by referring to a structure of a biological neural network, for example, by referring to a transfer mode between human brain neurons, and may further continuously perform self-learning. The electronic device 100 may implement intelligent cognition such as image recognition, facial recognition, speech recognition, and text understanding through the NPU.

The external memory interface 120 may be configured to connect to an external memory card, for example, a micro SD card, to extend a storage capability of the electronic device 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The processor 110 runs the instructions stored in the internal memory 121 to perform various function applications of the electronic device 100 and process data. The internal memory 121 may include a program storage area and a data storage area. The program storage area may store an operating system, an application required by at least one function (for example, a voice playing function or an image playing function), and the like. The data storage area may store data (for example, audio data, a phone book, and the like) created in a process of using the electronic device 100, and the like. In addition, the internal memory 121 may include a high-speed random access memory, and may further include a nonvolatile memory, for example, at least one magnetic disk storage device, a flash memory, or a universal flash storage (universal flash storage, UFS).

The electronic device 100 may implement audio functions, for example, music playback and recording, by using the audio module 170, the speaker 170A, the receiver 170B, the microphone 1700, the headset jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be disposed in the processor 110, or some function modules of the audio module 170 are disposed in the processor 110.

The speaker 170A, also referred to as a "loudspeaker", is configured to convert an electrical audio signal into a sound signal. The electronic device 100 may be configured to listen to music or answer a hands-free call by using the speaker 170A.

The receiver 170B, also referred to as an "earpiece", is configured to convert an electrical audio signal into a sound signal. When a call is answered or voice information is received by using the electronic device 100, the receiver 170B may be put close to a human ear to receive a voice.

The microphone 1700, also referred to as a "mike" or a "microphone", is configured to convert a sound signal into an electrical signal. When making a call or sending voice information, a user may make a sound near the microphone 170C, to input a sound signal to the microphone 170C. At least one microphone 170C may be disposed in the electronic device 100, in some other embodiments, two microphones 1700 may be disposed in the electronic device 100, to implement a noise reduction function, in addition to collecting a sound signal, in some other embodiments, three, four, or more microphones 1700 may alternatively be disposed in the electronic device 100, to collect a sound signal and reduce noise. The microphones may further identify a sound source, to implement a directional recording function, and the like.

The headset jack 170D is configured to connect to a wired headset. The headset jack 170D may be the USB interface 130 or a 3.5 mm open mobile terminal platform (open mobile terminal platform, OMTP) standard interface or cellular telecommunications industry association of the USA (cellular telecommunications industry association of the USA, CTIA) standard interface.

The pressure sensor 180A is configured to sense a pressure signal, and may convert the pressure signal into an electrical signal. In some embodiments, the pressure sensor 180A may be disposed on the display 194. There are a plurality of types of pressure sensors 180A such as a resistive pressure sensor, an inductive pressure sensor, and a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a capacitance change. When a touch operation is performed on the display 194, the electronic device 100 detects intensity of the touch operation by using the pressure sensor 180A. The electronic device 100 may also calculate a touch location based on a detection signal of the pressure sensor 180A. In some embodiments, touch operations that are performed in a same touch position but have different touch operation intensity may correspond to different operation instructions. For example, when a touch operation whose touch operation intensity is less than a first pressure threshold is performed on an SMS message application icon, an instruction for viewing an SMS message is executed. When a touch operation whose touch operation intensity is greater than or equal to the first pressure threshold is performed on an SMS message application icon, an instruction for creating a new SMS message is executed.

The gyro sensor 180B may be configured to determine a motion posture of the electronic device 100, in some embodiments, an angular velocity of the electronic device 100 around three axes (namely, axes x, y, and z) may be determined by using the gyro sensor 180B. The gyro sensor 180B may be configured to implement image stabilization during photographing. For example, when the shutter is pressed, the gyro sensor 180B detects an angle at which the electronic device 100 jitters, and calculates, based on the angle, a distance for which a lens module needs to compensate, and allows the lens to eliminate the jitter of the electronic device 100 through a reverse motion, to implement image stabilization. The gyro sensor 180B may be further used in a navigation scenario and a motion-sensing game scenario.

The barometric pressure sensor 180C is configured to measure barometric pressure. In some embodiments, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip cover by using the magnetic sensor 180D. In some embodiments, when the electronic device 100 is a clamshell phone, the electronic device 100 may detect opening and closing of a flip cover by using the magnetic sensor 180D. Further, a feature such as automatic unlocking upon opening of the flip cover is set based on a detected opening or closing state of the leather case or a detected opening or closing state of the flip cover.

The acceleration sensor 180E may detect accelerations in various directions (usually on three axes) of the electronic device 100, and may detect magnitude and a direction of gravity when the electronic device 100 is still. The acceleration sensor 180E may further be configured to identify a posture of the electronic device, and is applied to an application such as switching between a landscape mode and a portrait mode or a pedometer.

The distance sensor 180F is configured to measure a distance. The electronic device 100 may measure the distance in an infrared or a laser manner. In some embodiments, in a shooting scenario, the electronic device 100 may measure a distance by using the distance sensor 180F, to implement quick focusing.

The optical proximity sensor 180E may include a light emitting diode (LED) and an optical detector, for example, a photodiode. The light-emitting diode may be an infrared light-emitting diode. The electronic device 100 emits infrared light by using the light emitting diode. The electronic device 100 detects infrared reflected light from a nearby object by using the photodiode. When detecting sufficient reflected light, the electronic device 100 may determine that there is an object near the electronic device 100. When detecting insufficient reflected light, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a smart cover mode or a pocket mode to automatically unlock or lock the screen.

The ambient light sensor 180L is configured to sense ambient light brightness. The electronic device 100 may adaptively adjust brightness of the display 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some embodiments, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption for thermal protection. In some other embodiments, when the temperature is lower than another threshold, the electronic device 100 heats up the battery 142, to avoid abnormal shutdown of the electronic device 100 due to a low temperature. In some other embodiments, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display 194, and the touch sensor 180K and the display 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. The display 194 may provide a visual output related to the touch operation. In some other embodiments, the touch sensor 180K may alternatively be disposed on a surface of the electronic device 100 at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, to receive a blood pressure beating signal. In some embodiments, the bone conduction sensor 180M may alternatively be disposed in a headset to form a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The buttons 190 include a power button, a volume button, and the like. The button 190 may be a mechanical button, or may be a touch button. The electronic device 100 may receive a key input, and generate a key signal input related to a user setting and function control of the electronic device 100.

The motor 191 may generate a vibration prompt. The motor 191 may be configured to provide an incoming call vibration prompt and a touch vibration feedback. For example, touch operations performed on different applications (for example, photographing and audio playing) may correspond to different vibration feedback effects. The motor 191 may also correspond to different vibration feedback effects for touch operations performed on different areas of the display 194. Different application scenarios (for example, a time reminder, information receiving, an alarm clock, a game) may also correspond to different vibration feedback effects. A touch vibration feedback effect may be further customized.

The indicator 192 may be an indicator light, and may be configured to indicate a charging status and a power change, or may be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano-SIM card, a micro-SIM card, a SIM card, and the like. A plurality of cards may be simultaneously inserted into a same SIM card interface 195. The plurality of cards may be of a same type or of different types. The SIM card interface 195 may be compatible with different types of SIM cards. The SIM card interface 195 may be further compatible with an external memory card. The electronic device 100 interacts with a network through the SIM card, to implement functions such as calling and data communication. In some embodiments, the electronic device 100 uses an eSIM, namely, an embedded SIM card. The eSIM card may be embedded in the electronic device 100, and cannot be separated from the electronic device 100.

A software system of the electronic device 100 may use a layered architecture, an event-driven architecture, a microkernel architecture, a micro service architecture, or a cloud architecture. In an embodiment of this application, an Android system with a layered architecture is used as an example to describe a software structure of the electronic device 100.

Figure 2:
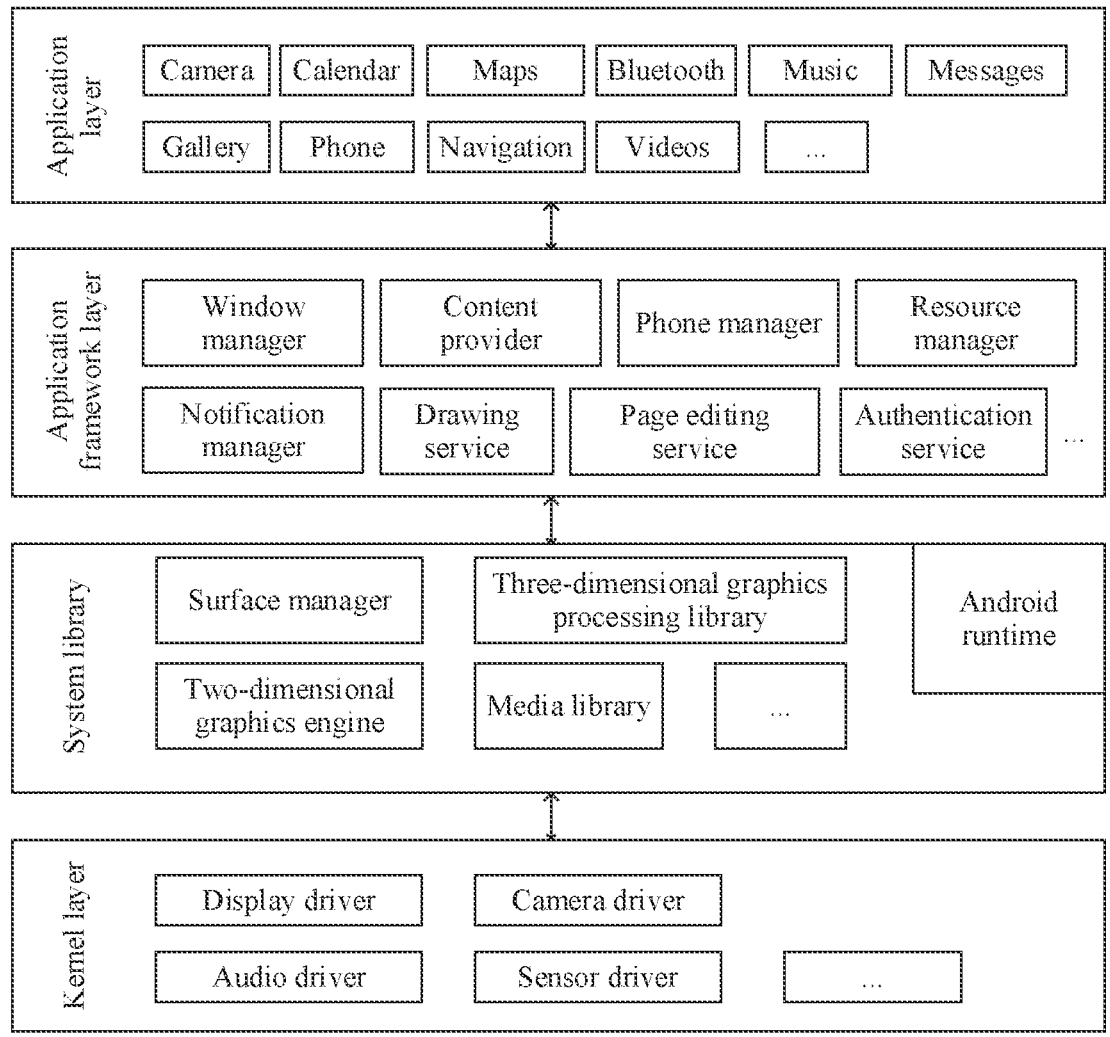
FIG. 2 is a schematic architectural diagram of an operating system in an electronic device according to an embodiment of this application.

FIG. 2 is a block diagram of a software structure of the electronic device 100 according to an embodiment of this application.

In a layered architecture, software is divided into several layers, and each layer has a clear role and task. The layers communicate with each other through a software interface. In some embodiments, the Android system is divided into four layers: an application layer, an application framework layer, an Android runtime (Android runtime) and system library, and a kernel layer from top to bottom.

The application layer may include a series of application packages.

As shown in FIG. 2, the application packages may include applications such as "Camera", "Gallery", "Calendar", "Phone", "Maps", "Navigation", "Bluetooth", "Music", "Videos", and "Messages".

The application framework layer provides an application programming interface (application programming interface, API) and a programming framework for an application at the application layer. The application framework layer includes some predefined functions.

As shown in FIG. 2, the application framework layer may include a page editing service and a drawing service (for example, SurfaceFlinger).

The drawing service may be used to build a display page for an application. The display page may include one or more views. For example, a display page including an SMS notification icon may include a view for displaying a text and a view for displaying a picture.

The page editing service may obtain display data on a current display page by using the drawing service. For example, when the application layer is running a playback page of a music APP, the page editing service may invoke a screenshot interface provided by the drawing service to take a screenshot of the playback page that is being displayed, and a pixel value of each pixel in the screenshot is the display data on the current display page. Further, the page editing service may modify pixel values of some pixels on the current display page based on a requirement of a user. For example, if the user chooses to hide an upper right area of the current playback page, the page editing service may modify a pixel value of each pixel in the upper right area in the foregoing screenshot, so that the upper right area displayed in the screenshot is blurred or pixelated. In this way, when the page editing service displays modified display data on the playback page to the user by using the drawing service, display content in the upper right area of the playback page is blurred or pixelated, so that the user can hide some sensitive data on the current page based on a requirement of the user when using each app, thereby protecting user privacy.

Alternatively, the page editing service may provide the user with a page locking function for locking the current display page. For example, the page editing service may set a flag bit for the currently displayed playback page. When the flag bit is 0, it indicates that the user has set the currently displayed playback page to "locked". When the flag bit is 1, it indicates that the user has not set the currently displayed playback page to "locked". In this way, if an operation (for example, a double-tap operation or a slide operation) entered by the user on the current playback page is detected, the page editing service may read the flag bit for the playback page. If the flag bit is 0, the page editing service may shield the operation of the user. Therefore, after the playback page is locked, an operation performed by an operator on the playback page cannot be responded to. In this way, if the user locks the current display page and displays the page to another user, the another user cannot perform an operation on the current display page, thereby avoiding disclosure of privacy content of the user.

Still as shown in FIG. 2, the application framework layer may further include an authentication service. The authentication service may determine, based on identity authentication information (for example, a fingerprint or a password) entered by the user, whether the user is an authorized user. In this case, after the page editing service locks the current display page or hides some display content on the current display page, the page editing service may further invoke the authentication service to disable the locking and hiding functions for the current display page. For example, if the current display page is locked, an electronic device may display an unlock button. If it is detected that the user taps the unlock button, the electronic device may require the user to enter identity authentication information such as a fingerprint and a password. Further, the page editing service (after receiving the identity authentication information entered by the user) may invoke the authentication service to perform identity authentication on the user. If the identity authentication succeeds, the page editing service may change the flag bit for the current display page from 0 to 1, to disable the locking function for the current display page. Similarly, if some display content on the current display page is hidden, when it is detected that the user taps the unlock button, the page editing service may also invoke the authentication service to perform identity authentication on the user. If the identity authentication succeeds, the electronic device may redisplay the hidden part on the current display page, so as to disable the hiding function for the current display page.

It should be noted that the content hiding function or the page locking function may be set in the electronic device as a system function, or may be set in an application as a function in the application. For example, the content hiding function or the page locking function may be set in a specific application (for example, a gallery app). In this way, when the electronic device displays a display page of the application, the user may operate the electronic device to hide display content on the display page or lock the display page. For another example, the content hiding function or the page locking function may be set in an operating system of the electronic device. In this way, when the electronic device displays a display page of any application, the user may operate the electronic device to hide display content on the display page or lock the display page. This is not limited in the embodiments of this application.

Certainly, the application framework layer may further include a window manager, a content provider, a phone manager, a resource manager, a notification manager, and the like.

The window manager is configured to manage a window program. A window manager may obtain a size of the display, determine whether there is a status bar, perform screen locking, take a screenshot, and the like. The content provider is configured to: store and obtain data, and enable the data to be accessed by an application. The data may include a video, an image, audio, calls that are made and received, a browsing history and a bookmark, a phone book, and the like. The phone manager is configured to provide a communication function of the electronic device 100, for example, management of a call status (including answering or declining). The resource manager provides various resources for an application, such as a localized character string, an icon, an image, a layout file, and a video file. The notification manager enables an application to display notification information in a status bar, and may be configured to convey a notification message. The notification manager may automatically disappear after a short pause without user interaction. For example, the notification manager is configured to: notify download completion, give a message notification, and the like. The notification manager may alternatively be a notification that appears in a top status bar of the system in a form of a graph or a scroll bar text, for example, a notification of an application running on the background or a notification that appears on the screen in a form of a dialog window. For example, text information is prompted in the status bar, a prompt tone is produced, the electronic device vibrates, or an indicator light blinks.

The Android Runtime includes a core library and a virtual machine. The Android runtime is responsible for scheduling and management of the Android system.

The kernel library includes two parts: One is a function that needs to be called by a java language, and the other is a kernel library of Android.

The applications layer and the application framework layer run on the virtual machine. The virtual machine executes Java files at the applications layer and the application framework layer as binary files. The virtual machine is configured to implement functions such as object lifecycle management, stack management, thread management, security and exception management, and garbage collection.

The system library may include a plurality of functional modules, for example, a surface manager (surface manager), a media library (Media. Libraries), a three-dimensional graphics processing library (for example, OpenGL ES), and a 2D graphics engine (for example, SGL).

The surface manager is configured to manage a display subsystem and provide fusion of 2D and 3D layers for a plurality of applications.

The media library supports playback and recording of a plurality of commonly used audio and video formats, static image files, and the like. The media library may support a plurality of audio and video coding formats such as MPEG-4, H.264, MP3, AAC, AMR, PG, and PNG.

The three-dimensional graphics processing library is configured to implement three-dimensional graphics drawing, image rendering, composition, layer processing, and the like.

The 2D graphics engine is a drawing engine for 2D drawing.

The kernel layer is a layer between hardware and software. The kernel layer includes at least a display driver, a camera driver, an audio driver, a sensor driver, and the like. This is not limited in this embodiment of this application.

Figure 3:
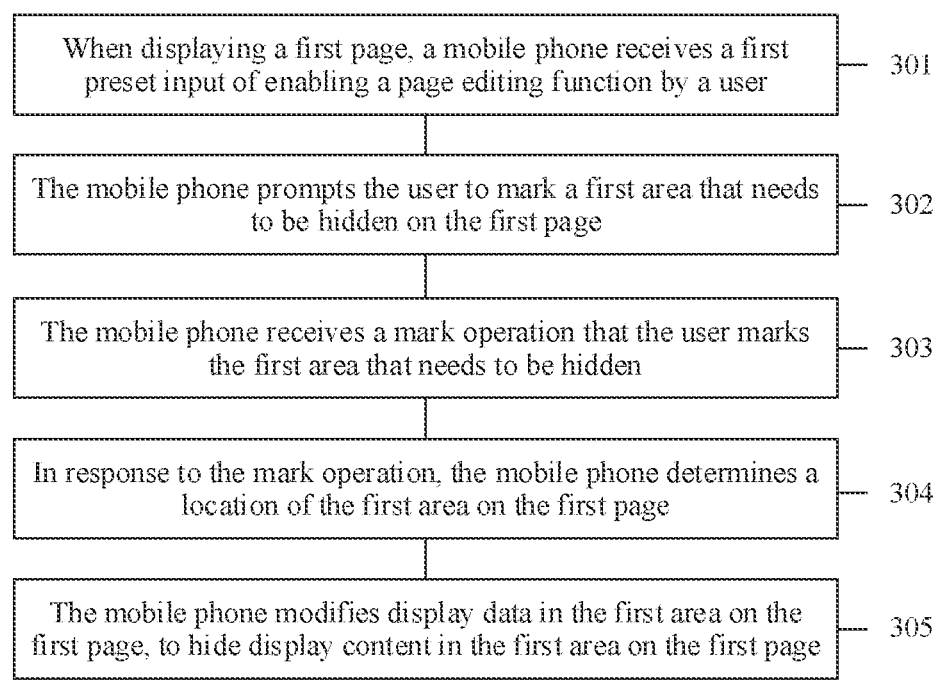
FIG. 3 is a first schematic flowchart of an electronic device control method according to an embodiment of this application.

The following describes in detail an electronic device control method provided in the embodiments of this application with reference to the accompanying drawings. As shown in FIG. 3, the electronic device control method includes steps S301 to S305. Steps S301 to S305 are described by using an example in which a mobile phone is used as an electronic device.

S301: When displaying a first page, the mobile phone receives a first preset input of enabling a page editing function by a user.

After a screen of the mobile phone is unlocked, the mobile phone may display a home screen (which may also be referred to as a home screen) or a page of an application. If the user wants to edit a page (for example, the first page) that is being displayed, the user may enter the first preset input on the mobile phone. For example, the first preset input may be a preset gesture such as a slide gesture, a tap gesture, or a press gesture. Alternatively, the first preset input may be a preset gesture such as a floating gesture or a motion sensing gesture. A value of an acceleration sensor (or a screen sensor) is read, and the read value is compared with a preset value. If an enabling condition is met, a page area editing service is enabled. Alternatively, an edit button may be preset in the mobile phone. If it is detected that the user taps the edit button, it may be determined that the user executes the first preset input of enabling a page editing function. It indicates that the user wants to edit the first page that is being displayed on the mobile phone.

Figure 4A:
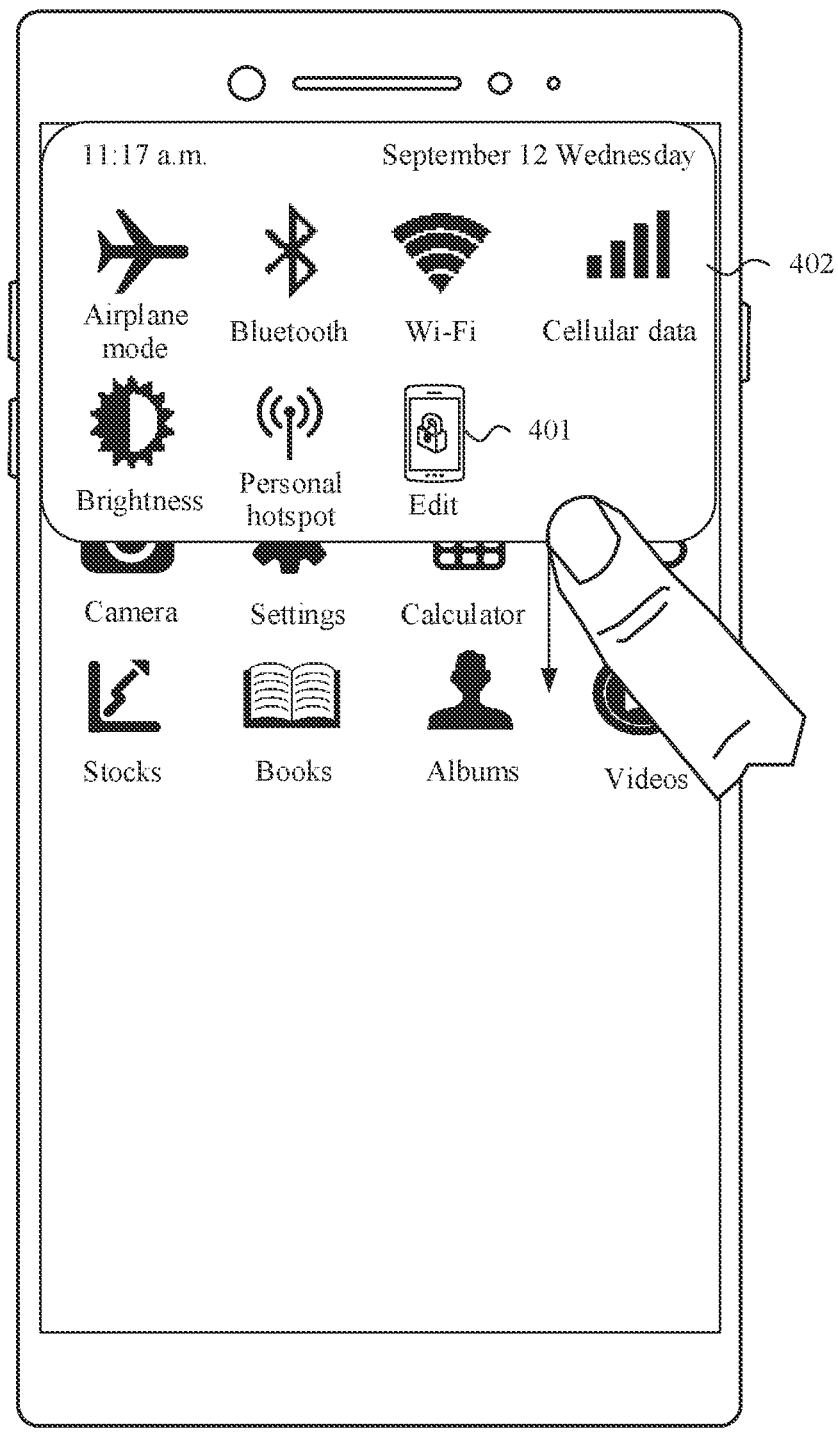
FIG. 4(a), FIG. 4(b), and FIG. 4(c) are a first schematic diagram of a scenario of an electronic device control method according to an embodiment of this application.
Figure 4B:
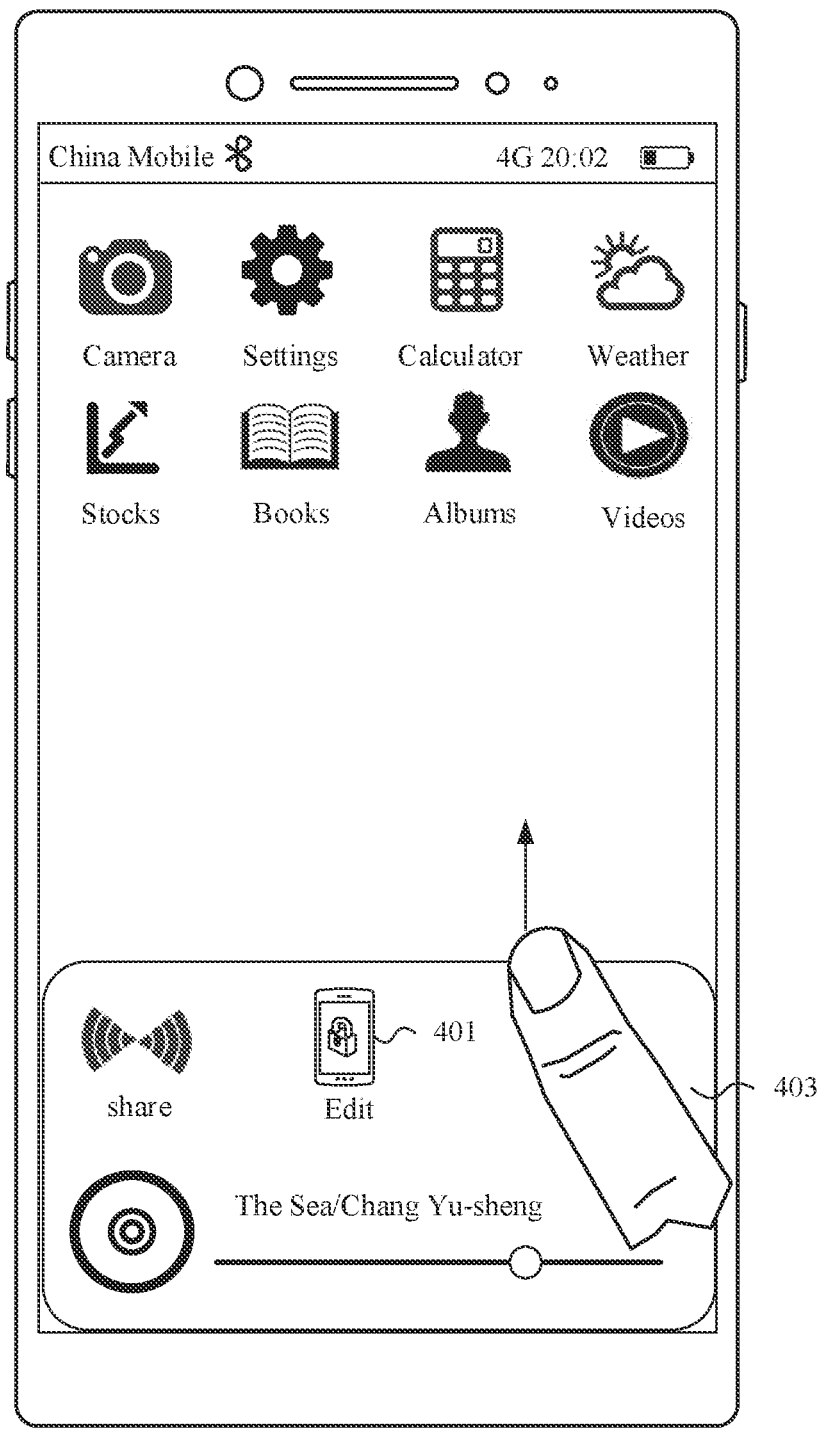
Figure 4C:
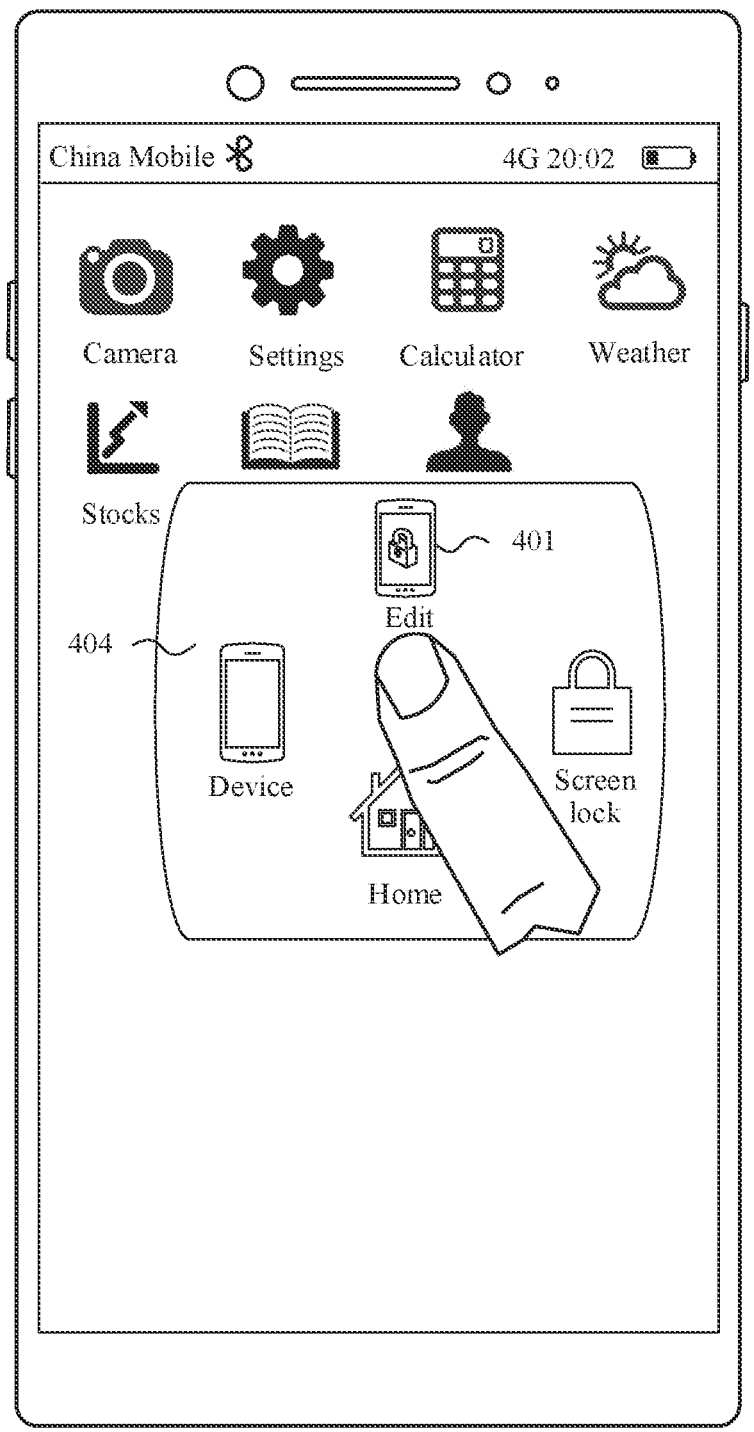

For example, as shown in FIG. 4(a), an "Edit" button 401 may be set in a drop-down menu 402. Alternatively, as shown in FIG. 4(b), an "Edit" button 401 may be set in a pull-up menu 403. Alternatively, as shown in FIG. 4(c), an "Edit" button 401 may be set in a floating menu 404. Certainly, the "Edit" button 401 may be a virtual button or a physical button. This is not limited in the embodiments of this application.

Figure 5A:
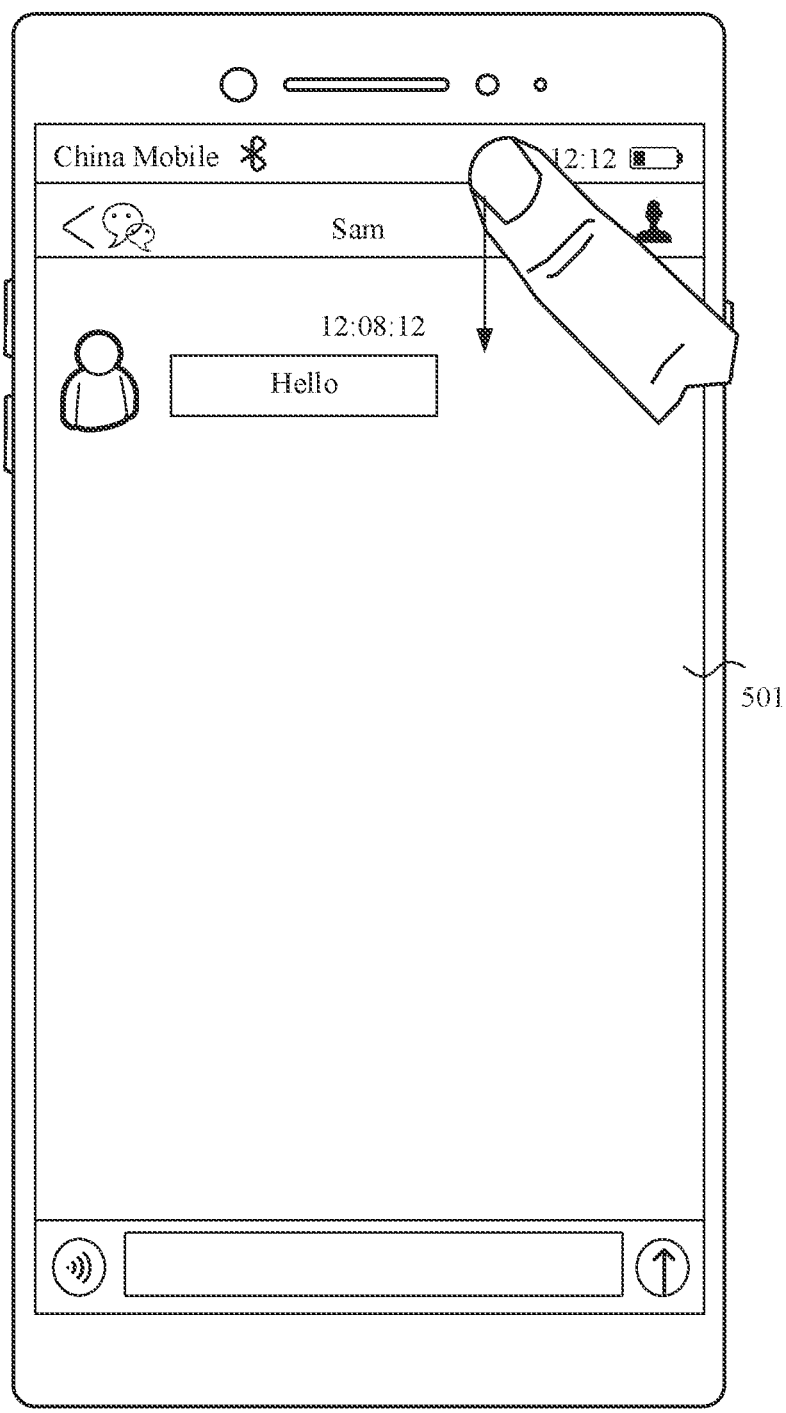
FIG. 5(a) and FIG. 5(b) are a second schematic diagram of a scenario of an electronic device control method according to an embodiment of this application.
Figure 5B:
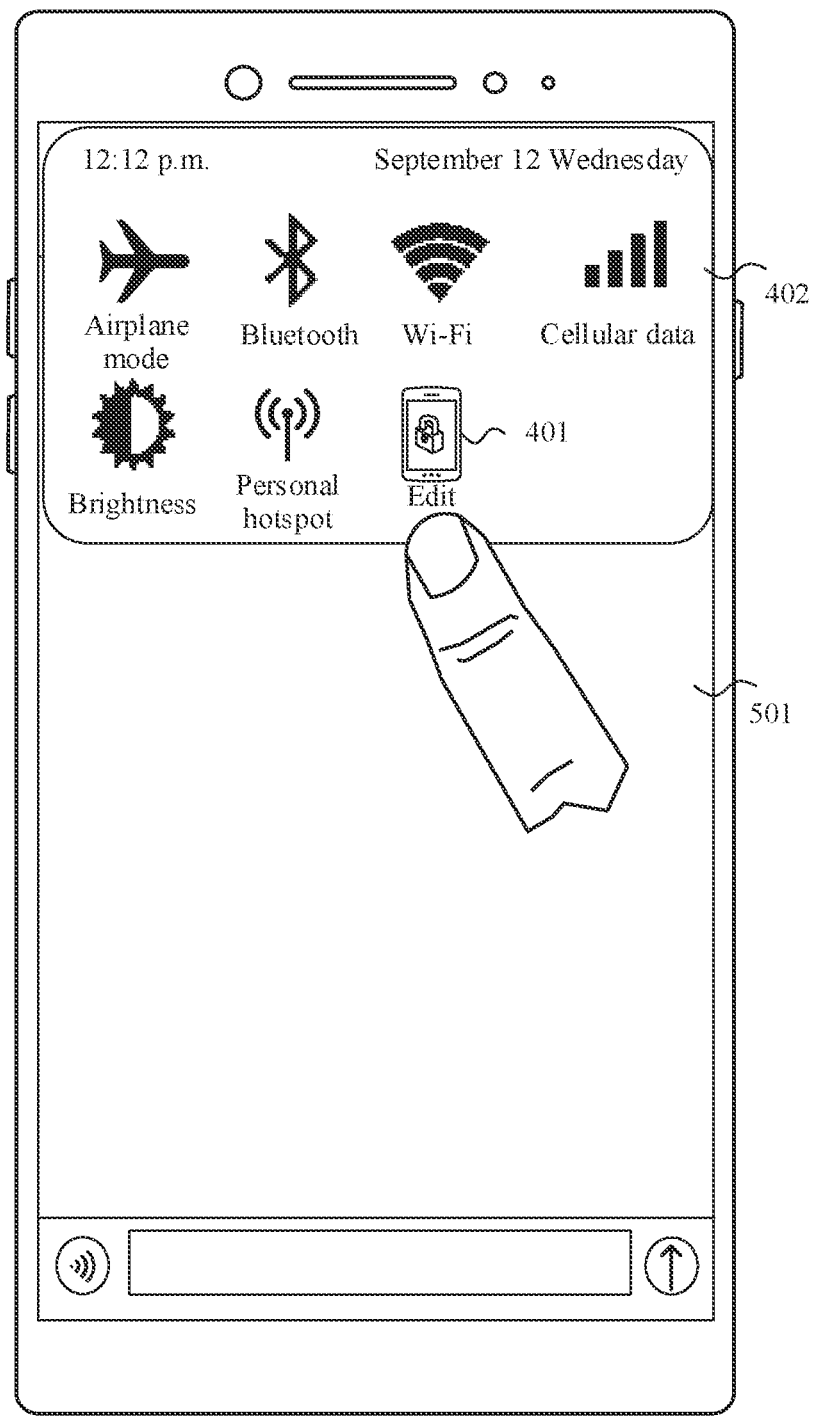

For example, the first page is a chat page of a WeChat app. As shown in FIG. 5(a), when the mobile phone displays a chat page 501 of the WeChat app, if the user wants to hide some display content on the chat page 501, the user may perform a pull-down operation starting from the top of the touchscreen. After detecting the pull-down operation entered by the user, as shown in FIG. 5(b), the mobile phone may display the drop-down menu 402 including the "Edit" button 401. Further, if it is detected that the user taps the "Edit" button 401, it indicates that the user performs the first preset input of enabling a page editing function.

In this case, in response to the first preset input, the mobile phone may invoke a drawing service at an application framework layer to obtain display data on the chat page 501 that is being displayed. For example, the mobile phone may take a screenshot of the chat page 501 that is being displayed by using a screenshot interface provided by the drawing service, to obtain a screenshot of the chat page 501. The screenshot includes a pixel value of each pixel on the chat page 501, and the pixel value is the display data on the chat page 501. Subsequently, the mobile phone may modify the display data on the chat page 501, so that some display content on the chat page 501 is hidden.

S302: The mobile phone prompts the user to mark a first area that needs to be hidden on the first page.

For example, the first page is still the chat page 501. After the user enables the page editing function for the chat page 501, the mobile phone may prompt the user to mark one or more areas (that is, the first area, which may also be referred to as a hidden area) that need to be hidden subsequently on the chat page 501. Certainly, the mobile phone may also prompt the user to mark one or more areas (for example, a second area, which may also be referred to as a non-hidden area) that need to be retained subsequently on the chat page 501. Further, the mobile phone may determine, as the first area that needs to be hidden, an area other than the second area marked by the user on the chat page 501.

Figure 6:
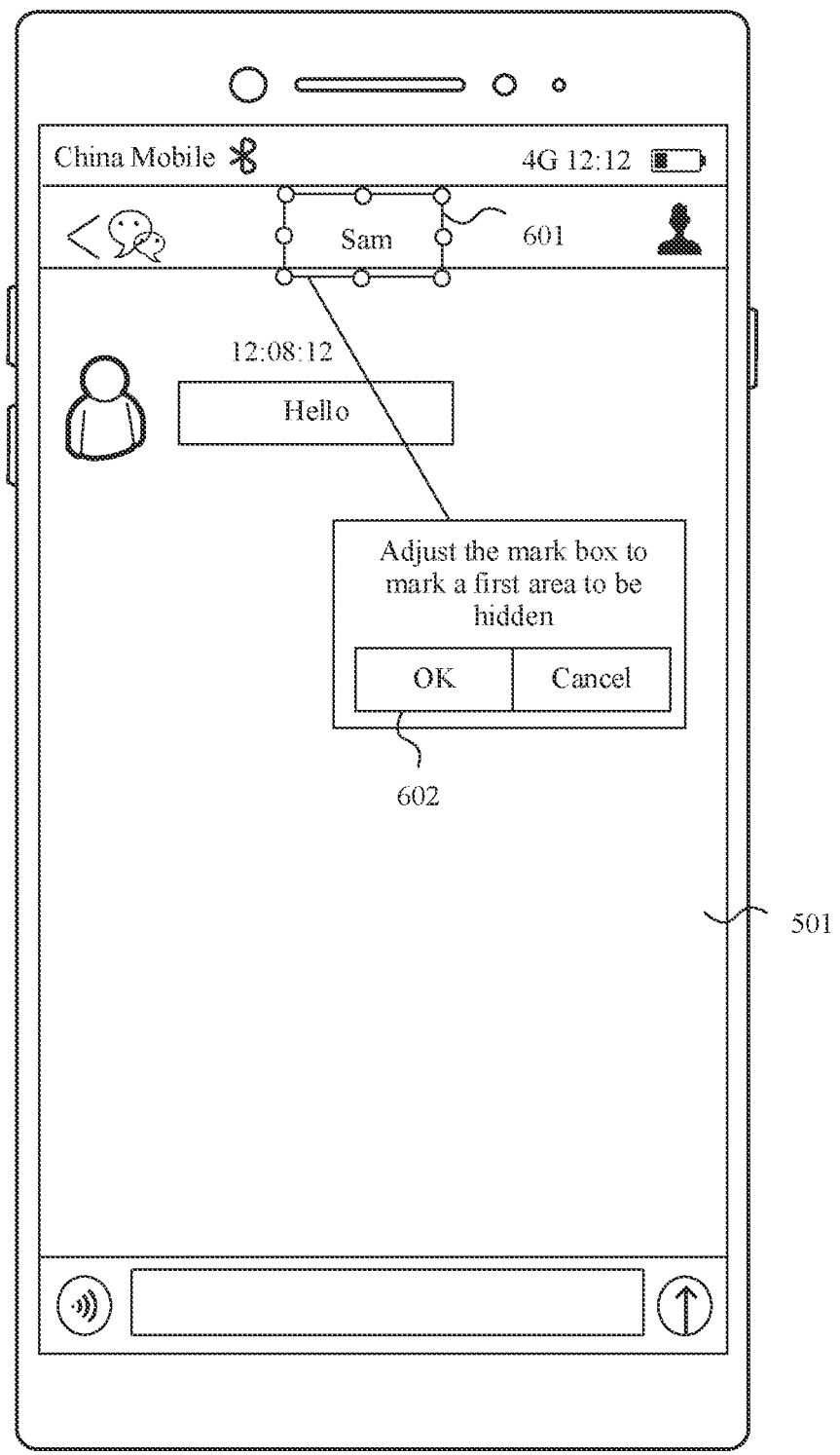
FIG. 6 is a third schematic diagram of a scenario of an electronic device control method according to an embodiment of this application.

For example, the mobile phone may perform image recognition on the chat page 501 by using a specific image recognition algorithm, to automatically identify key information related to privacy content on the chat page 501. For example, the key information may be a phone number, a contact name, a transaction record, or a face. In addition, the mobile phone marks the identified key information for user selection. As shown in FIG. 6, the mobile phone may identify that the key information on the chat page 501 includes a contact name "Sam". Further, the mobile phone may mark the contact name "Sam" by using a first mark box 601. Still as shown in FIG. 6, a size and a location of the first mark box 601 may be adjusted. The user may adjust the size and the location of the first mark box 601 on the chat page 501, to mark the key information that needs to be hidden on the chat page 501. In this case, the first area that needs to be hidden is an area in which the first mark box 601 is located. Alternatively, the user may unmark information that does not need to be hidden, and hide only the remaining marked information.

Figure 7:
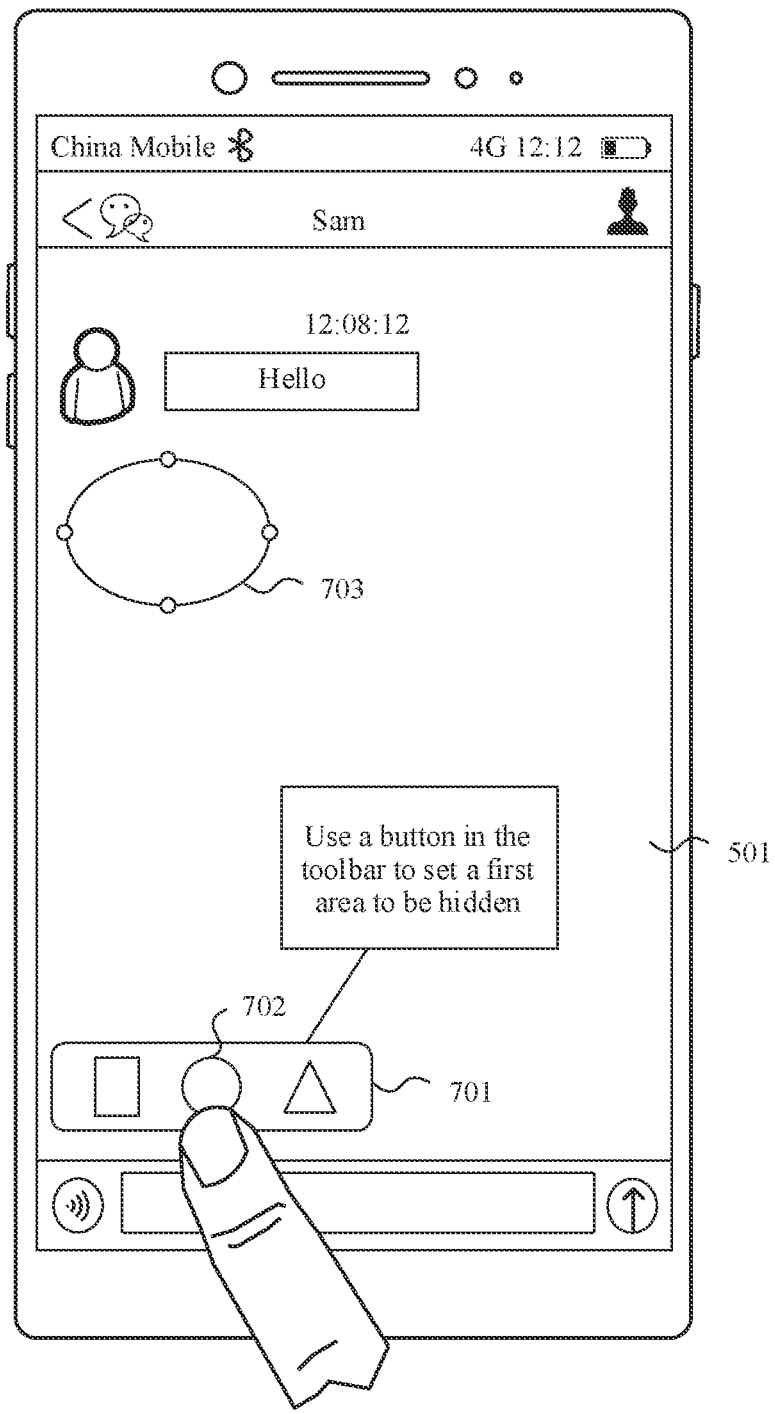
FIG. 7 is a fourth schematic diagram of a scenario of an electronic device control method according to an embodiment of this application.

For another example, as shown in FIG. 7, the mobile phone may set a toolbar 701 on the chat page 501, and the toolbar 701 includes tool buttons 702 in different shapes. After detecting that the user taps a tool button 702, the mobile phone may display, on the chat page 501 according to a shape of the selected tool button 702, a second mark box 703 whose size and location are adjustable. In this way, the user may adjust the size and the location of the second mark box 703 on the chat page 501, to mark the first area that needs to be hidden on the chat page 501.

Certainly, in addition to the mark box or the tool button, the mobile phone may further prompt, in a form of text, animation, voice, or the like, the user to mark the first area that needs to be hidden on the first page. In addition, a shape of the first mark box or the second mark box may be a rectangle, or may be any other shape such as a triangle or a circle. This is not limited in the embodiments of this application.

S303: The mobile phone receives a mark operation that the user marks the first area that needs to be hidden.

S304: in response to the mark operation, the mobile phone determines a location of the first area on the first page.

In steps S303 and S304, the user may mark, according to a prompt (for example, the tool button 701) on the first page (for example, the chat page 501), one or more first areas that need to be hidden on the chat page 501. For example, as shown in FIG. 6, the user may mark the contact name "Sam" on the chat page 501 as the first area by using the first mark box 601. If it is detected that the user taps an "OK" button 602 on the chat page 501, the mobile phone may obtain coordinate information of the first mark box 601, For example, the mobile phone may obtain coordinates of an upper left vertex and coordinates of a lower right vertex in the first mark box 601. In this case, the coordinates of the upper left vertex and the coordinates of the lower right vertex in the first mark box 601 are the coordinate information of the first mark box 601. In this way, the mobile phone may determine a specific location of the first area on the chat page 501 based on the coordinate information of the first mark box 601.

Figure 8:
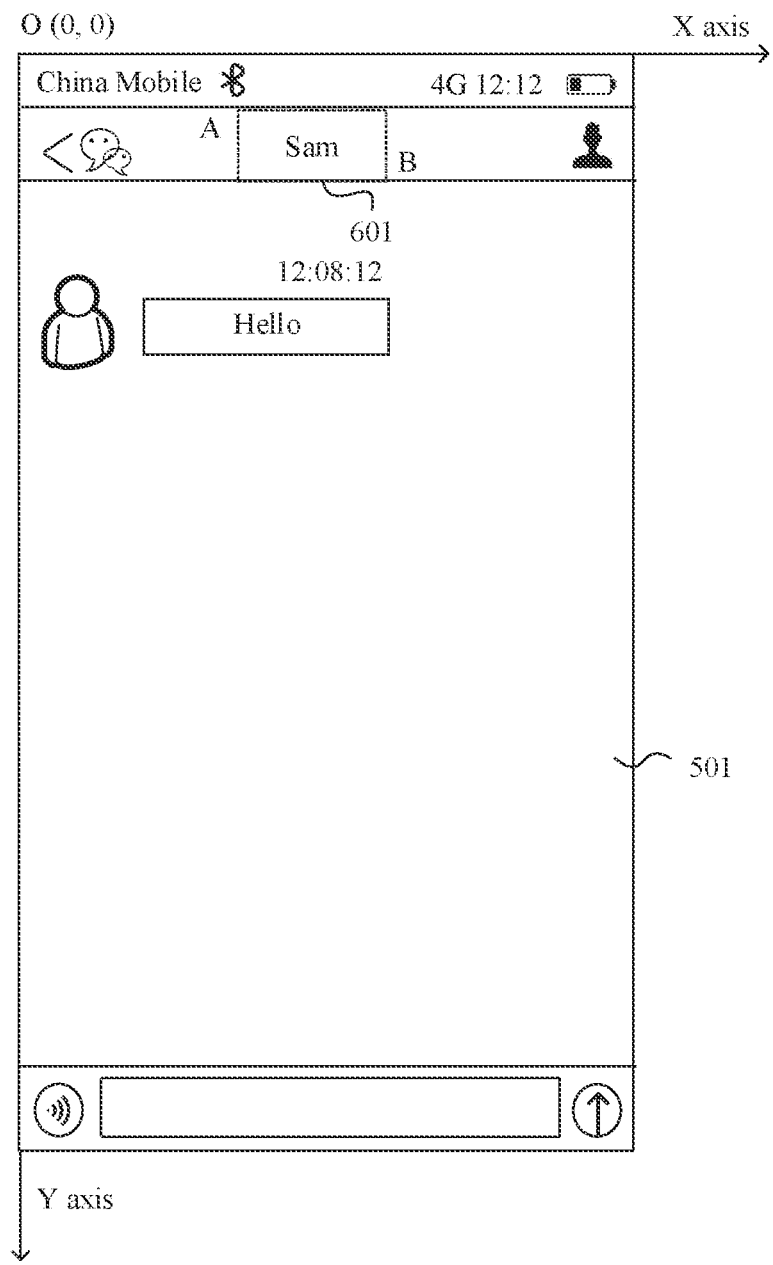
FIG. 8 is a fifth schematic diagram of a scenario of an electronic device control method according to an embodiment of this application.

For example, as shown in FIG. 8, a size of the chat page 501 is 810×1080 (in pixels). The mobile phone may use an upper left vertex O of the chat page 501 as an origin, to obtain an upper left vertex A (390, 100) of the first mark box 601 and a lower right vertex B (430, 250) of the first mark box 601 through calculation. In this case, the first area that needs to be hidden and that is marked by the user on the chat page 501 is a rectangular area including the vertex A and the vertex B.

Figure 9A:
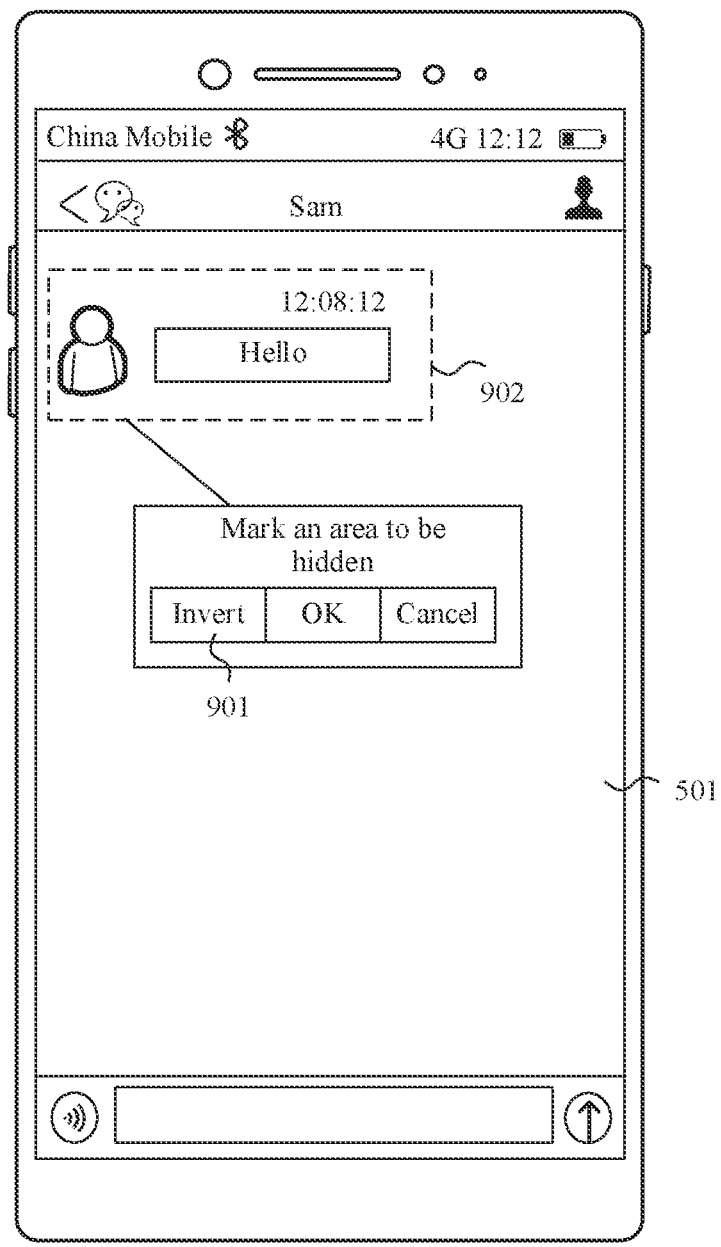
FIG. 9(a) and FIG. 9(h) are a sixth schematic diagram of a scenario of an electronic device control method according to an embodiment of this application.
Figure 9B:
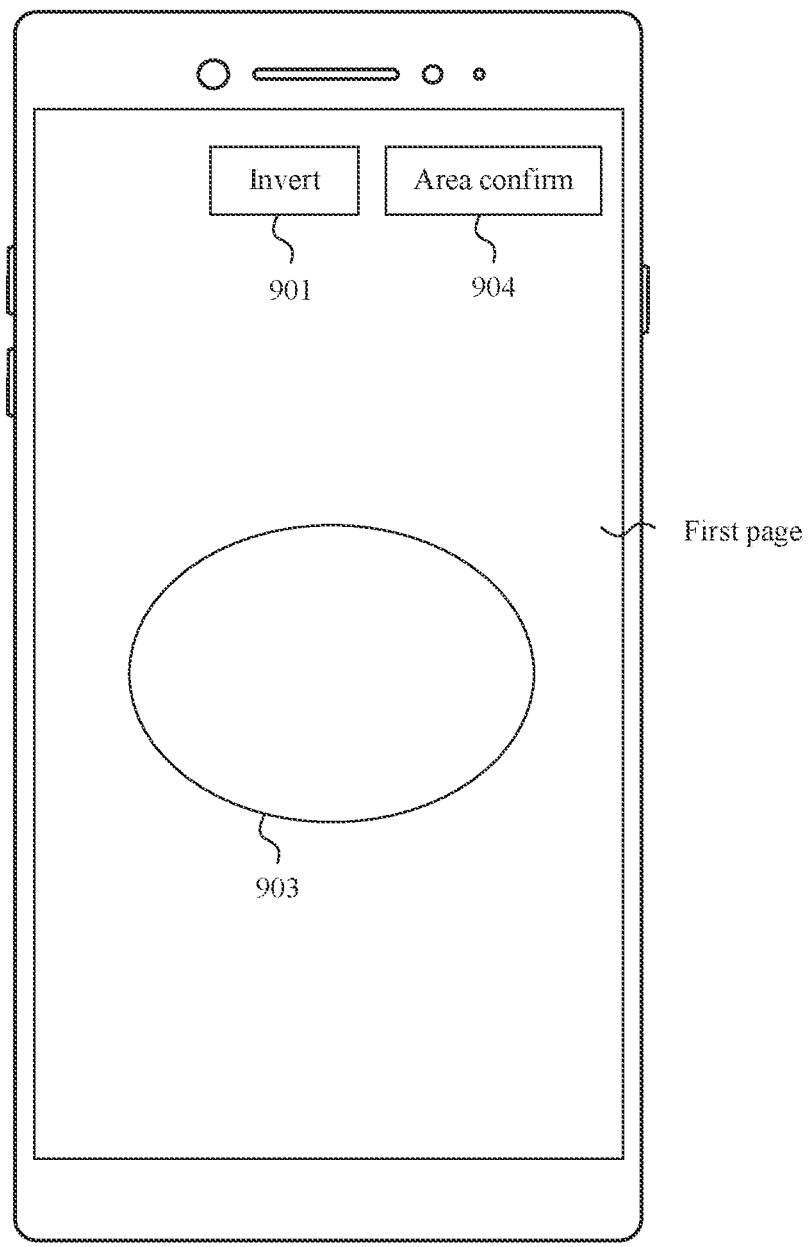

In some other embodiments, as shown in FIG. 9(*a*), when the user marks the first area that needs to be hidden on the chat page 501, the mobile phone may further display an "Invert" button 901 in this case, the user may mark the second area that needs to be retained on the chat page 501 by using the first mark box or the second mark box. For example, after the user marks an area 902 on the chat page 501 by using the first mark box 601, if it is detected that the user taps the "Invert" button 901, it indicates that the user wants to use an area other than the area 902 on the chat page 501 as the first area that needs to be hidden. Therefore, the mobile phone may determine a specific location of the area (that is, the first area) other than the area 902 on the chat page 501 based on the coordinate information of the first mark box 601. If it is detected that the user taps the "Invert" button 901, the mobile phone may display the area other than the area 901 on the chat page 501 as "marked". Alternatively, as shown in FIG. 9(*b*), an area 903 is the first area marked by the user on the first page. The "Invert" button 901 and an "Area confirm" button 904 may alternatively be set on the first page (for example, the chat page 501). This is not limited in the embodiments of this application.

S305: The mobile phone modifies display data in the first area on the first page, to hide display content in the first area on the first page.

Figure 10A:
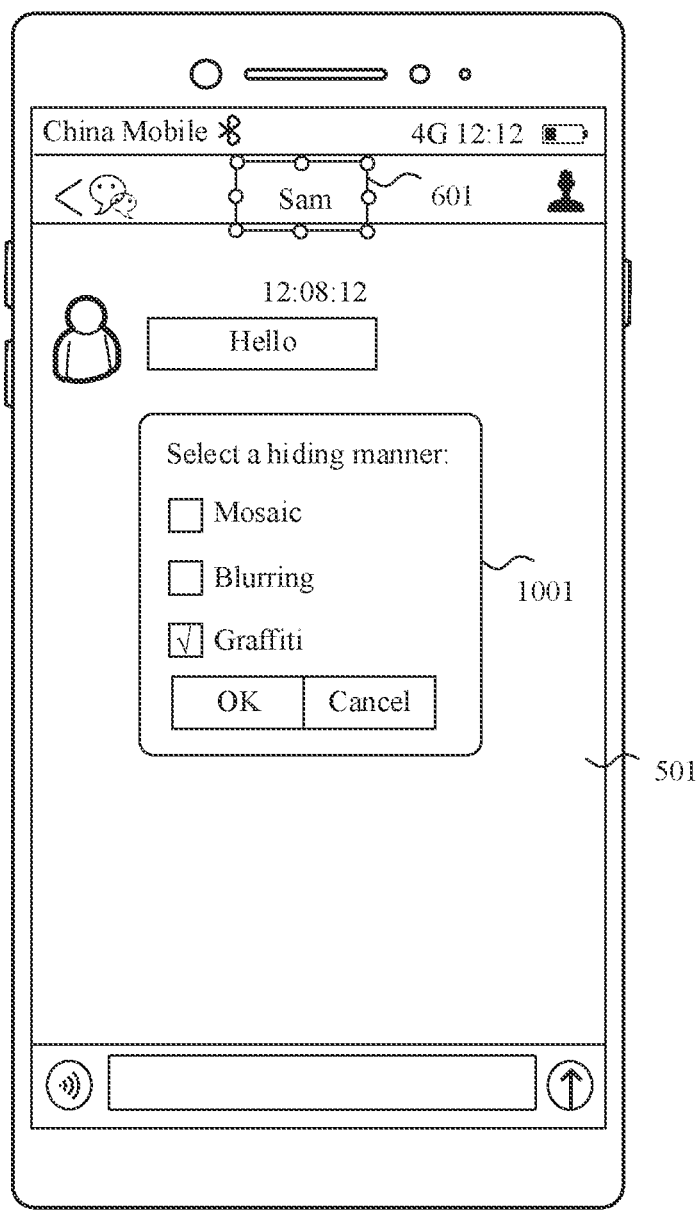
FIG. 10(a) and FIG. 10(b) are a seventh schematic diagram of a scenario of an electronic device control method according to an embodiment of this application.
Figure 10B:
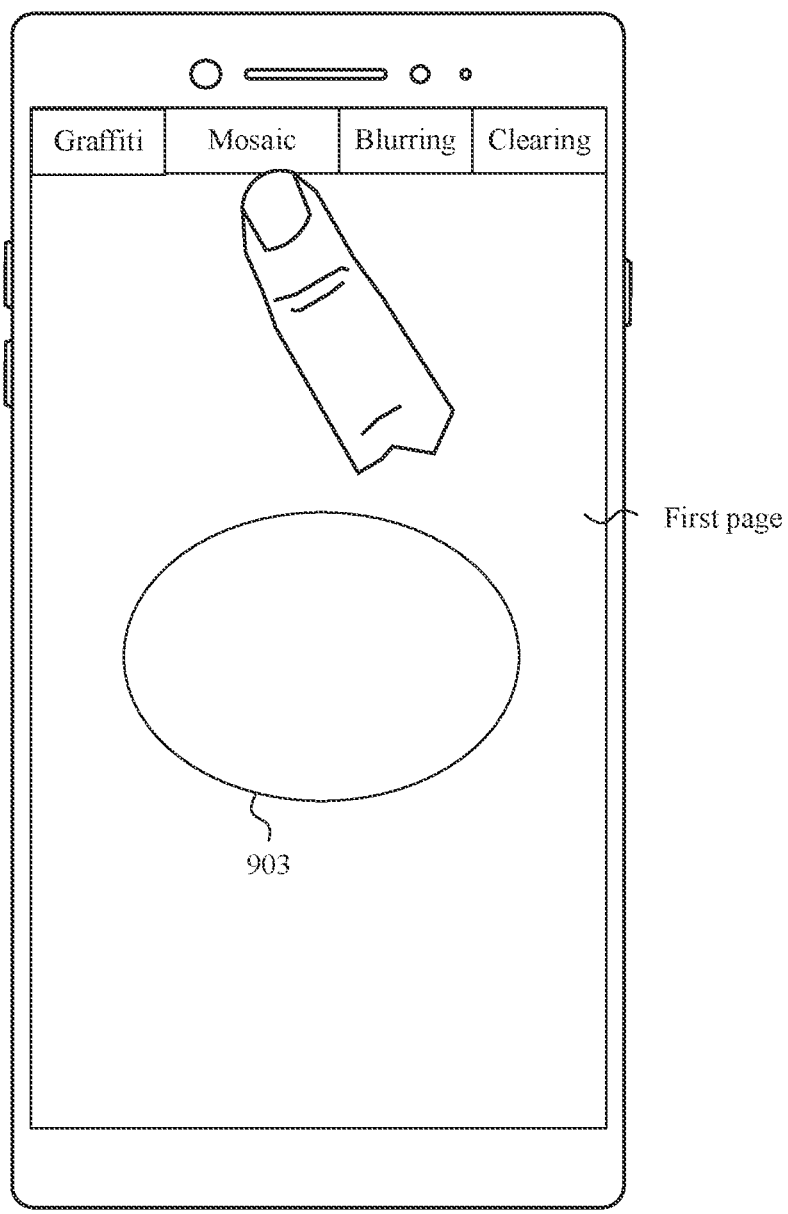

After the mobile phone determines the location of the first area on the first page (for example, the chat page 501), the mobile phone may prompt the user with a hiding manner that is to be used for the display content in the first area. As shown in FIG. 10(*a*), the mobile phone may display a first prompt box 1001, and the first prompt box 1001 includes specific hiding manners such as mosaic, blurring, clearing, and graffiti. The user may select one of these hiding manners to hide the display content in the first area. Alternatively, as shown in FIG. 10(*b*), the area 903 is the first area marked by the user on the first page. Specific hiding manners such as mosaic, blurring, clearing, and graffiti may alternatively be set on the first page (for example, the chat page 501) for user selection. This is not limited in the embodiments of this application.

Figure 11:
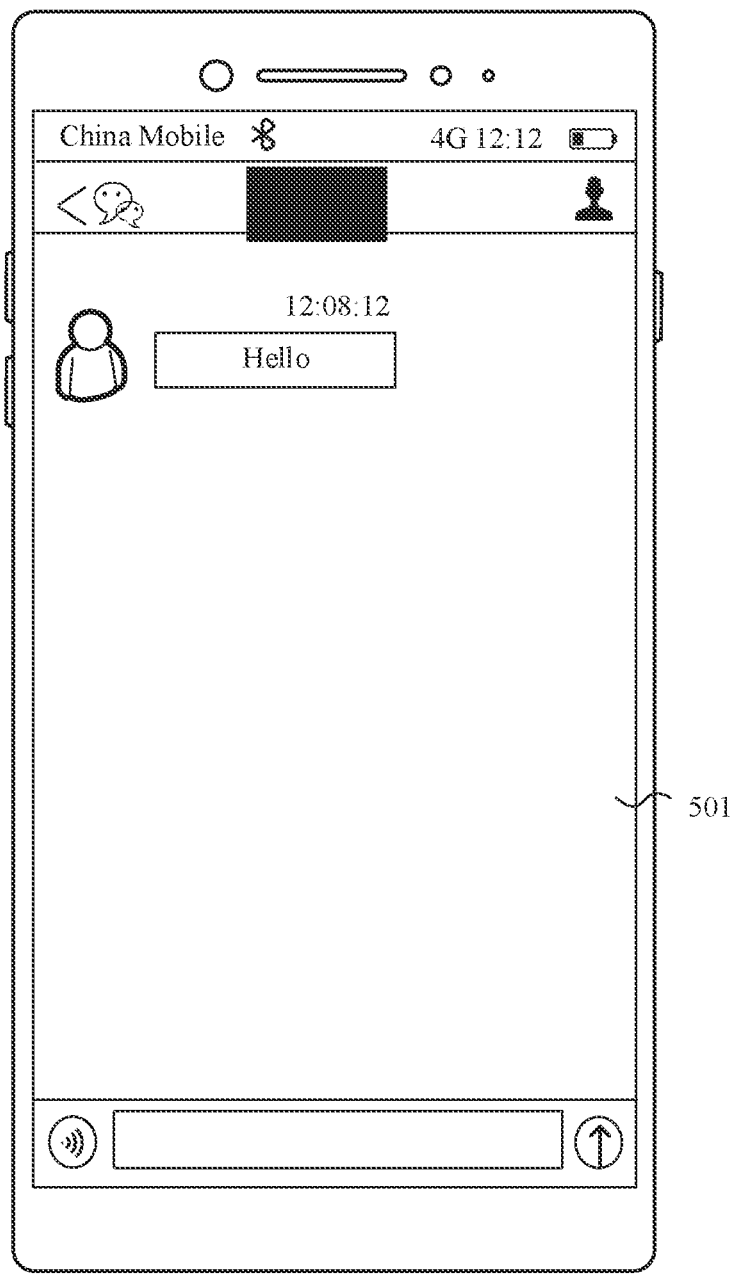
FIG. 11 is an eighth schematic diagram of a scenario of an electronic device control method according to an embodiment of this application.

For example, the user selects the hiding manner of graffiti. The mobile phone has obtained the pixel value of each pixel on the chat page 501 (that is, the display data on the chat page 501) in step S301, and the mobile phone has determined the specific location of the first area on the chat page 501 in step S304. Therefore, in step S305, the mobile phone may change a pixel value of each pixel in the first area to a pixel value 0 of a black pixel, or assign a value corresponding to a background pixel to a pixel value of each pixel in the first area. In this way, as shown in FIG. 11, the mobile phone may display modified display data on the That page 501 on the touchscreen. In this case, the first area marked by the user on the chat page 501 is doodled in black, so that the contact name Sam on the chat page 501 is hidden, thereby avoiding disclosure of the privacy content on the display page.

In addition, if the user selects another hiding manner such as blurring (or mosaic), the mobile phone may alternatively modify a pixel value of each pixel in the first area in the display data on the chat page 501 by using a corresponding blurring algorithm (or mosaic algorithm), so that the display content in the first area is hidden. Certainly, after determining the specific location of the first area on the first page, the mobile phone may alternatively hide the display content in the first area in a default hiding manner (for example, blurring). This is not limited in the embodiments of this application.

Figure 12:
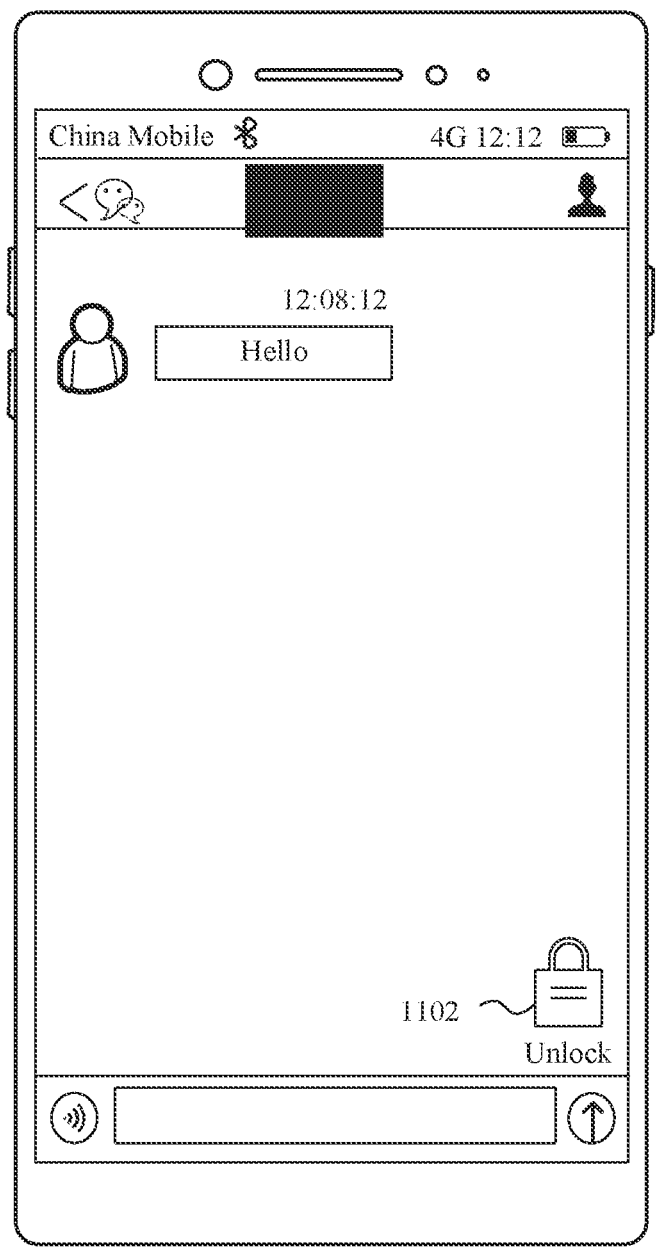
FIG. 12 is a ninth schematic diagram of a scenario of an electronic device control method according to an embodiment of this application.

Further, after the mobile phone hides the display content in the first area on the first page, the user may further redisplay the display content in the first area by entering identity authentication information. For example, if it is detected that a fingerprint entered by the user is a fingerprint of an authorized user, the mobile phone may display the initial unmodified display data on the first page on the touchscreen. In this case, the actual display content in the first area on the first page is also displayed. Alternatively, as shown in FIG. 12, when displaying the first page on which the first area is hidden, the mobile phone may further display a "Redisplay" button 1102. The "Redisplay" button 1102 may be located on the first page, or may be located in a pull-up menu, a drop-down menu, or a floating menu. If it is detected that the user taps the "Redisplay" button 1102, the mobile phone may prompt the user to enter identity authentication information. The identity authentication information may be a digital password, a fingerprint, an iris, a face, a gesture, a pattern password, or the like. This is not limited in the embodiments of this application. If the identity authentication information entered by the user is prestored identity authentication information of an authorized user, the mobile phone may redisplay the display content in the first area on the first page.

It can be learned that, in the electronic device control method provided in the embodiments of this application, the user may manually set, based on a requirement of the user, display content that needs to be hidden on the display page. For example, on a page, only a specific piece of data needs to be viewed by another user, and other information does not need to be viewed by another user. In this case, the user only needs to simply set the data or an area in which the data is located to "non-hidden", and the mobile phone may modify some display data on the display page according to the setting of the user, so that the display content is hidden. In this way, when the mobile phone displays the display page, the display content in the hidden area that is set by the user is not exposed to another user. In a public place, the user may use the foregoing method to hide some sensitive areas on a display page based on a requirement of the user, thereby avoiding disclosure of privacy content of the user.

In some other embodiments of this application, if the mobile phone receives, when displaying the first page, the first preset input of enabling a page editing function by the user, in addition to a function of hiding some display content on the first page, the mobile phone may further provide the user with a function of locking the first page. Alternatively, if the mobile phone receives, when displaying the first page, a second preset input entered by the user, the mobile phone may provide the user with a function of locking the first page. The second preset input is different from the first preset input. For example, the first preset input may be an operation of tapping a first button in the drop-down menu by the user, and the second preset input may be an operation of tapping a second button in the drop-down menu by the user.

Figure 13:
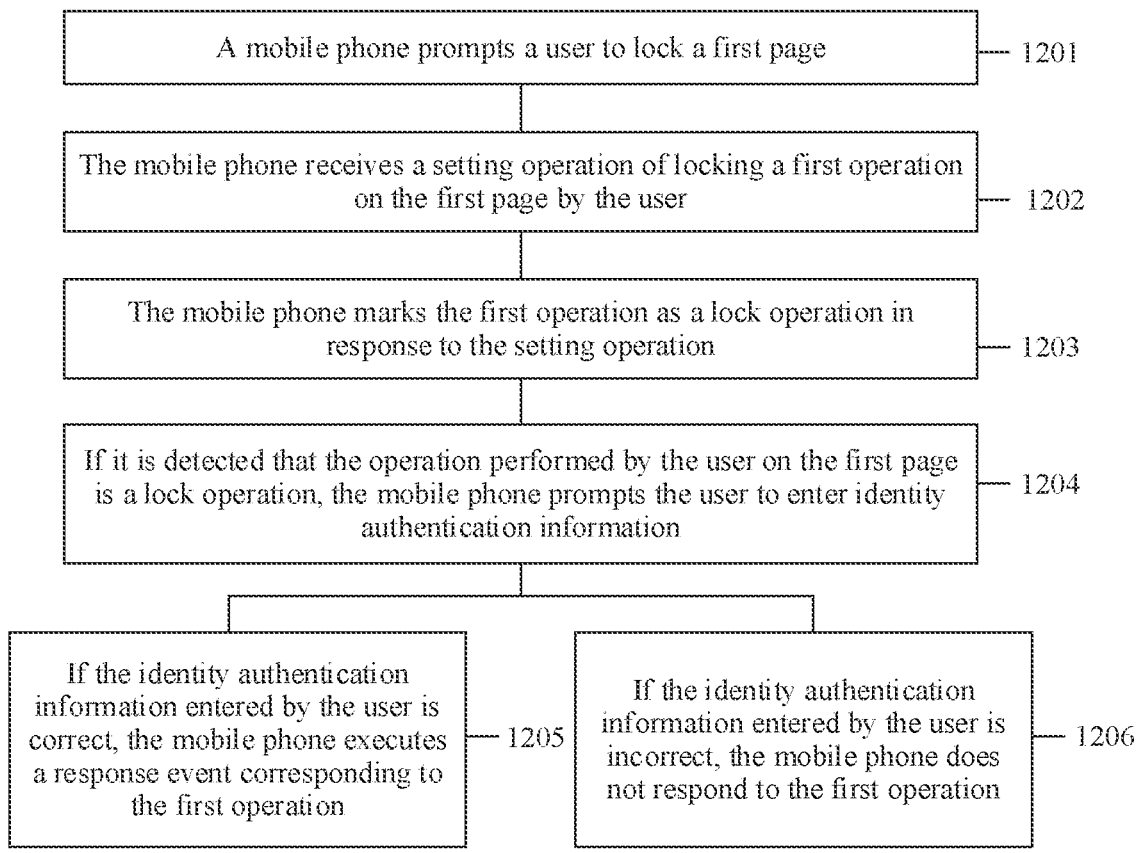
FIG. 13 is a second schematic flowchart of an electronic device control method according to an embodiment of this application.

Specifically, as shown in FIG. 13, the electronic device control method provided in the embodiments of this application includes steps S1201 to S1206. Steps S1201 to S1206 are described by using an example in which a mobile phone is used as an electronic device.

S1201: The mobile phone prompts a user to lock a first page.

Figure 14A:
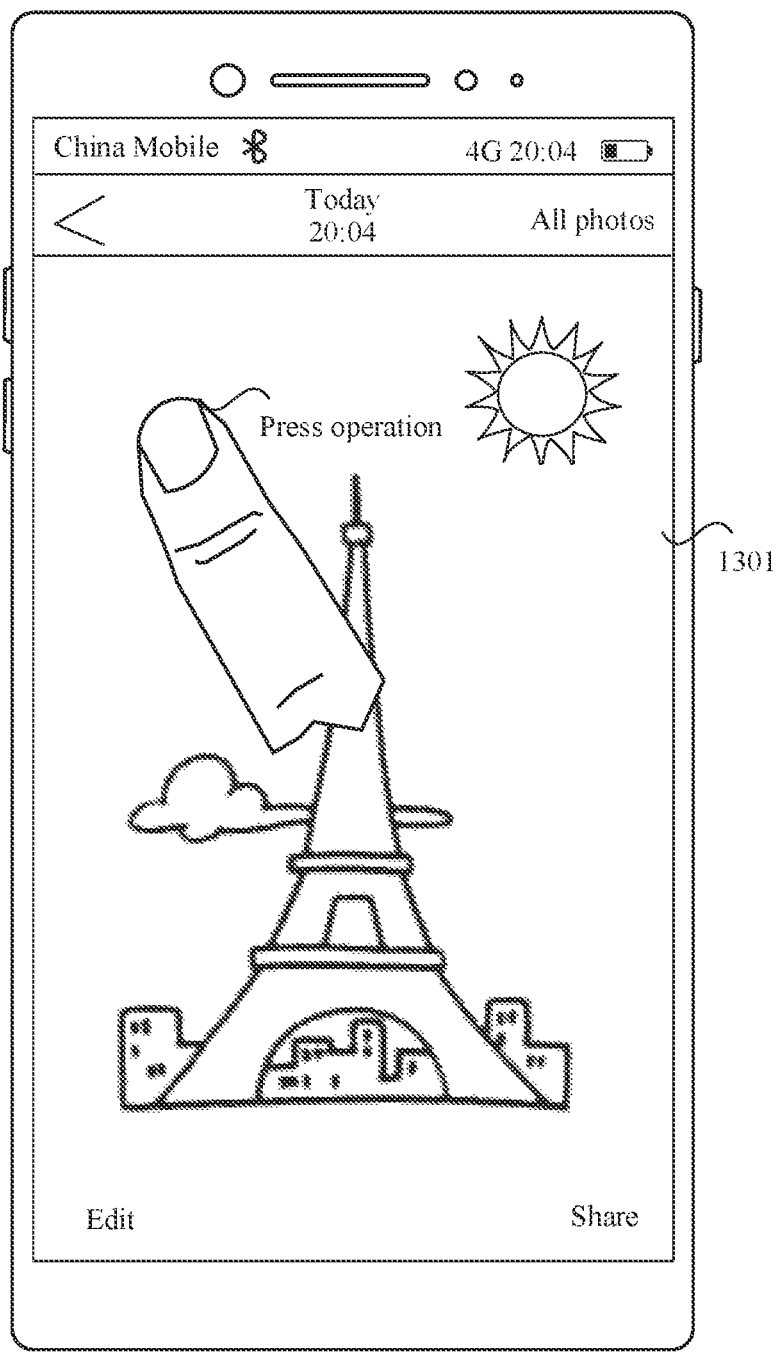
FIG. 14(a) and FIG. 14(b) are a tenth schematic diagram of a scenario of an electronic device control method according to an embodiment of this application.
Figure 14B:
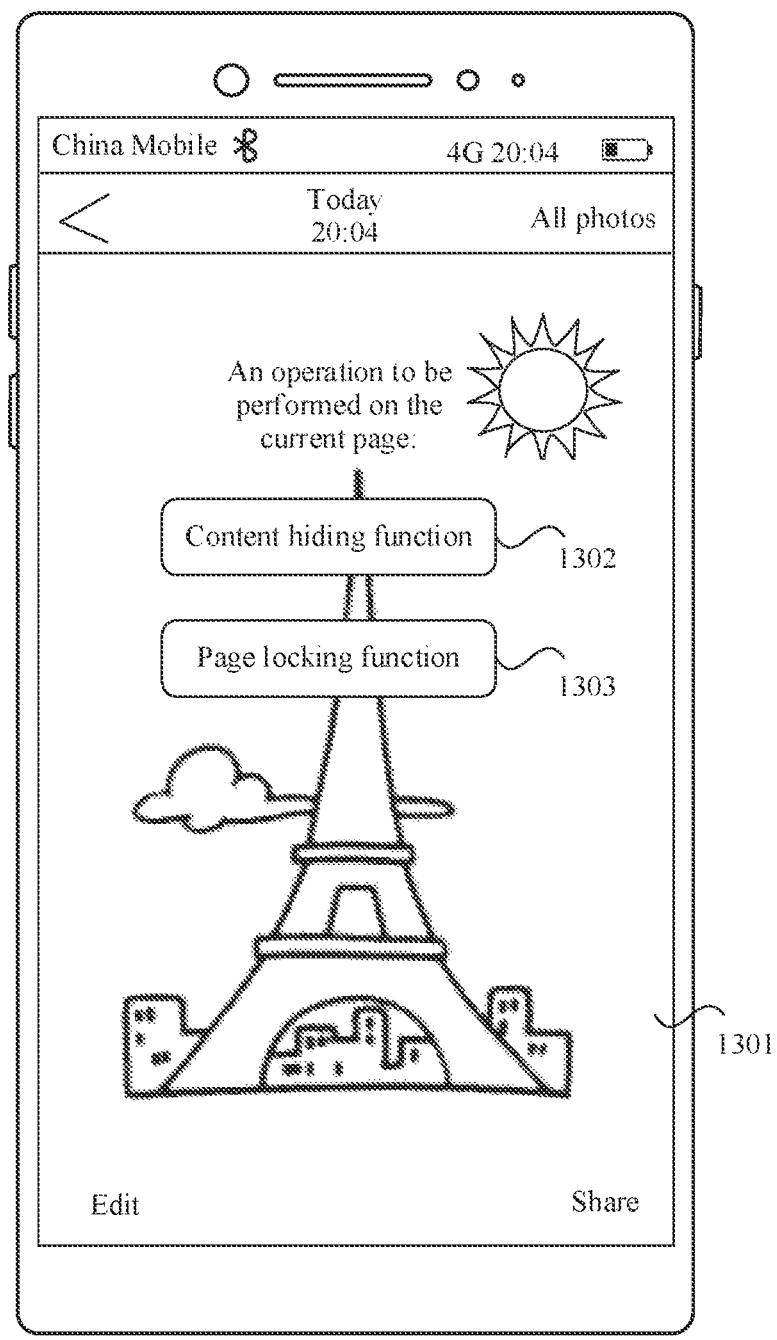

For example, as shown in FIG. 14(*a*), the first page is a preview page 1301 of a picture A in a gallery app. When the mobile phone displays the preview page 1301 of the picture A, if the user wants to give the mobile phone to another user to view the picture A, but does not want the another user to view another picture in the gallery app, the user may enter a first preset input (or a second preset input) on the mobile phone, to enable a function of locking the first page. For example, the first preset input is a press operation. As shown in FIG. 14(*a*), if it is detected that the user enters the press operation (for example, a touch and hold operation or a pressure operation) on the preview page 1301, it indicates that the user needs to enable a page editing function for the preview page 1301. As shown in FIG. 14(*b*), the mobile phone may prompt the user to select two functions provided by a page editing service at an application framework layer, that is, a function 1302 of hiding some display content on a page and a function 1303 of locking a current page.

If it is detected that the user selects the hiding function 1302, the mobile phone may hide, according to the method described in steps S302 to S305 in the foregoing embodiment, display content in a first area that is set by the user on the preview page 1301. Correspondingly, if it is detected that the user selects the locking function 1303, the mobile phone may continue to perform the following steps S1202 to S1206.

For example, if it is detected that the user selects the locking function 1303, it indicates that the user wants to lock the mobile phone on the preview page 1301, so that content of another page is not displayed. Therefore, the mobile phone may set the preview page 1301 to a locked state. In a locked state, the mobile phone does not respond to any operation performed by the user on the preview page 1301. For example, a lock flag bit may be preset in the mobile phone for the current display page. When the lock flag bit is 1, it indicates that the current display page is in a locked state. When the lock flag bit is 0, it indicates that the current display page is in an unlocked state. In this case, after detecting that the user selects the lock function 1303, the mobile phone may set the lock flag bit to 1.

Subsequently, if it is detected that the user enters an operation (for example, a slide operation or an operation of returning to a home screen) on the preview page 1301, the mobile phone may read the lock flag bit for the preview page 1301, to determine whether the preview page 1301 is in a locked state currently. If the preview page 1301 is in a locked state, the mobile phone may shield an operation currently entered by the user. For example, after detecting a slide event entered by the user, the application program framework layer in the mobile phone may stop reporting the slide event to the gallery app, so that the gallery app cannot respond to the slide event to display a next picture. Certainly, if the preview page 1301 is in an unlocked state, the mobile phone may normally respond to an operation entered by the user. That is, once the user locks the current display page, the mobile phone does not respond to an operation received on the display page, thereby avoiding a problem that user privacy is disclosed because another user views the mobile phone of the user.

Alternatively, when the preview page 1301 that is being displayed on the mobile phone is in a locked state, the mobile phone may respond to some operations related to the preview page 1301, for example, a stretch operation, a pinch operation, or a brightness adjustment operation on the preview page 1301. However, when an operation entered by the user on the preview page 1301 is used to switch a current display page, for example, the user enters a slide operation of viewing a next picture, the mobile phone may shield the slide operation currently entered by the user, thereby preventing privacy content of the user from being disclosed after the user switches to another display page.

Alternatively, the mobile phone may prompt the user to select a specific operation that is set as a lock operation that the mobile phone is not allowed to respond to when the first page is displayed. In this case, the mobile phone may perform the following steps S1202 to S1206, so that the user can customize, based on a requirement of the user, an operation that the mobile phone cannot respond to when the preview page 1301 is displayed.

S1202: The mobile phone receives a setting operation of locking a first operation on the first page by the user.

Figure 15A:
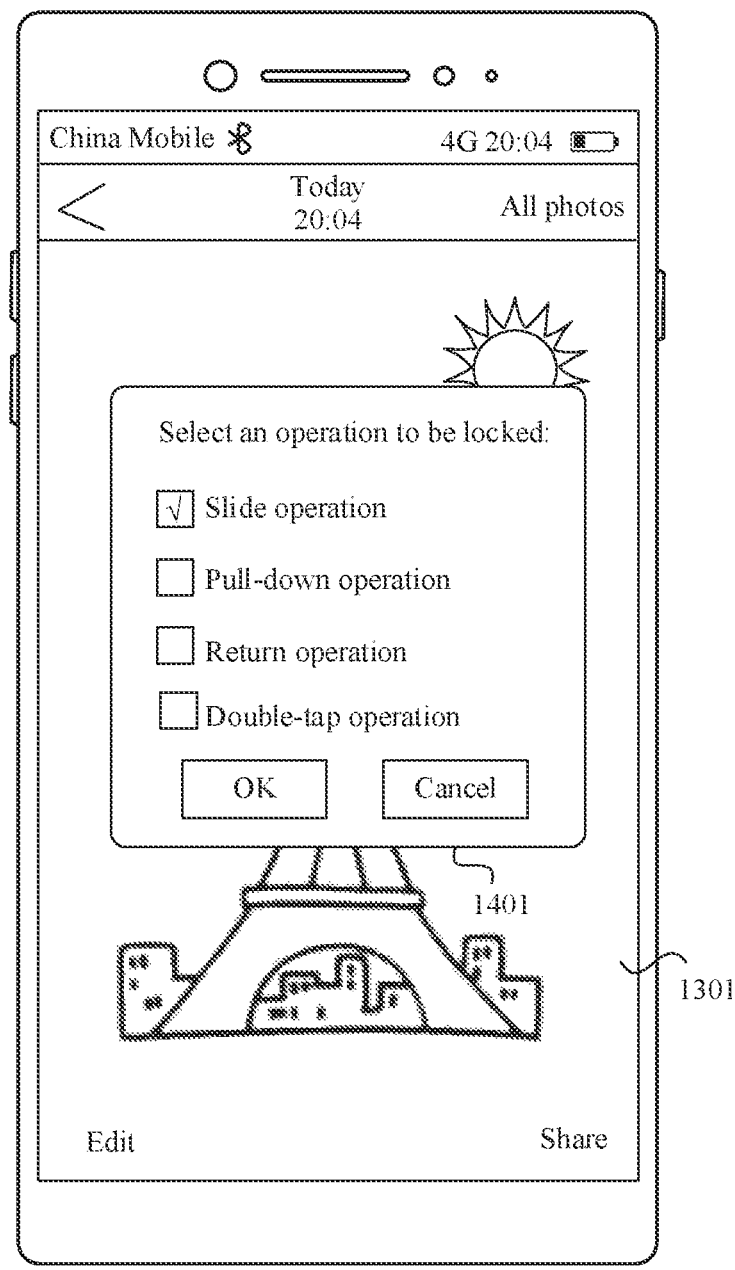
FIG. 15(a) and FIG. 15(b) are an eleventh schematic diagram of a scenario of an electronic device control method according to an embodiment of this application.
Figure 15B:
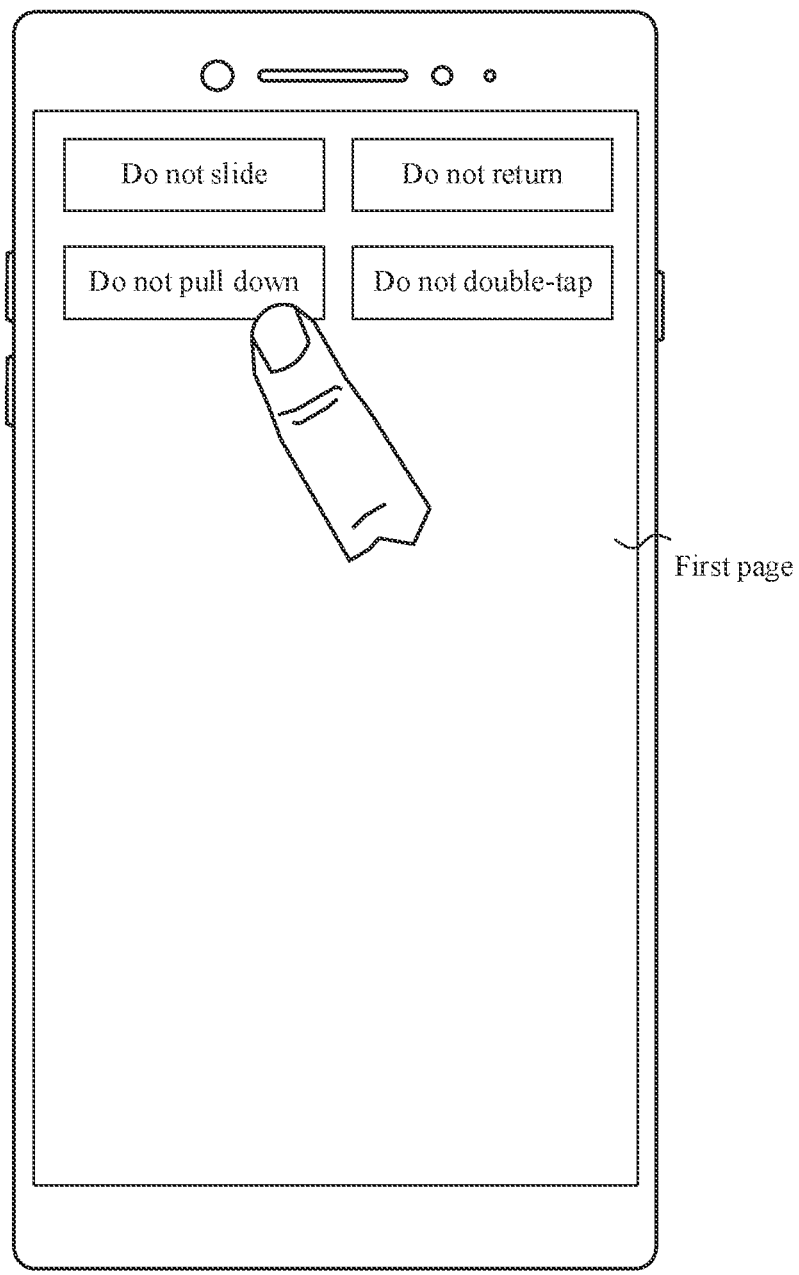

For example, if it is detected that the user selects the locking function 1303 shown in FIG. 14(*h*), as shown in FIG. 15(*a*), the mobile phone may prompt the user to select one or more operations that the mobile phone cannot respond to when the preview page 1301 is displayed. For example, a second prompt box 1401 displayed on the mobile phone provides one or more candidate operations that can be entered by the user when the mobile phone displays the preview page 1301, for example, a slide operation, a pull-down operation, a return operation, a double-tap operation, and an operation of returning to a home screen (Home). The return operation is an operation of jumping to an upper-level menu, and the operation of returning to a home screen is an operation of jumping to a home screen of a mobile phone. Alternatively, as shown in FIG. 15(*b*), the one or more candidate operations may be set on the first page (for example, the preview page 1301) for user selection. This is not limited in the embodiments of this application.

In some embodiments, the mobile phone may further prompt the user to lock one or more functions on the first page. For example, the mobile phone may learn that a page type of the first page is a picture preview page in the gallery app. In this case, the mobile phone may further obtain functions supported by the preview page, for example, functions such as stretching a picture, pinching a picture, deleting a picture, and sharing a picture. In this case, similar to FIG. 15(*a*) and FIG. 15(*b*), when displaying the preview page 1301, the mobile phone may further prompt the user to lock one or more functions of stretching a picture, pinching a picture, deleting a picture, and sharing a picture on the preview page 1301. This is not limited in the embodiments of this application.

The user may select one or more candidate operations based on a requirement of the user. For example, the user selects the slide operation in the second prompt box 1401. If the mobile phone detects that the user chooses to lock the slide operation (that is, the first operation) on the preview page 1301, it indicates that the user does not want to respond to a slide operation entered by another user when the preview page 1301 is displayed. In this case, the mobile phone may continue to perform the following steps S1203 to S1206.

S1203: The mobile phone marks the first operation as a lock operation in response to the setting operation.

For example, the first operation is still the slide operation selected by the user. After the mobile phone detects that the slide operation selected by the user is a lock operation that needs to be locked, the mobile phone may mark the slide operation as the lock operation. For example, as shown in Table 1, a flag bit may be preset in the mobile phone for each of a slide operation, a pull-down operation, a return operation, and a double-tap operation. After detecting that the user selects the slide operation in the second prompt box 1401, the mobile phone may change the flag bit for the slide operation to 1, indicating that the user locks the slide operation on the preview page 1301. Correspondingly, if a flag bit for an operation is 0, it indicates that the user does not lock the operation on the preview page 1301, it should be noted that the user may select one or more operations as lock operations. This is not limited in the embodiments of this application.

TABLE 1

| Operations supported on a current display page | Flag bit |
| --- | --- |
| Slide operation | 1 |
| Pull-down operation | 0 |
| Return operation | 0 |
| Double-tap operation | 0 |

S1204: If it is detected that the operation performed by the user on the first page is a lock operation, the mobile phone prompts the user to enter identity authentication information.

Figure 16A:
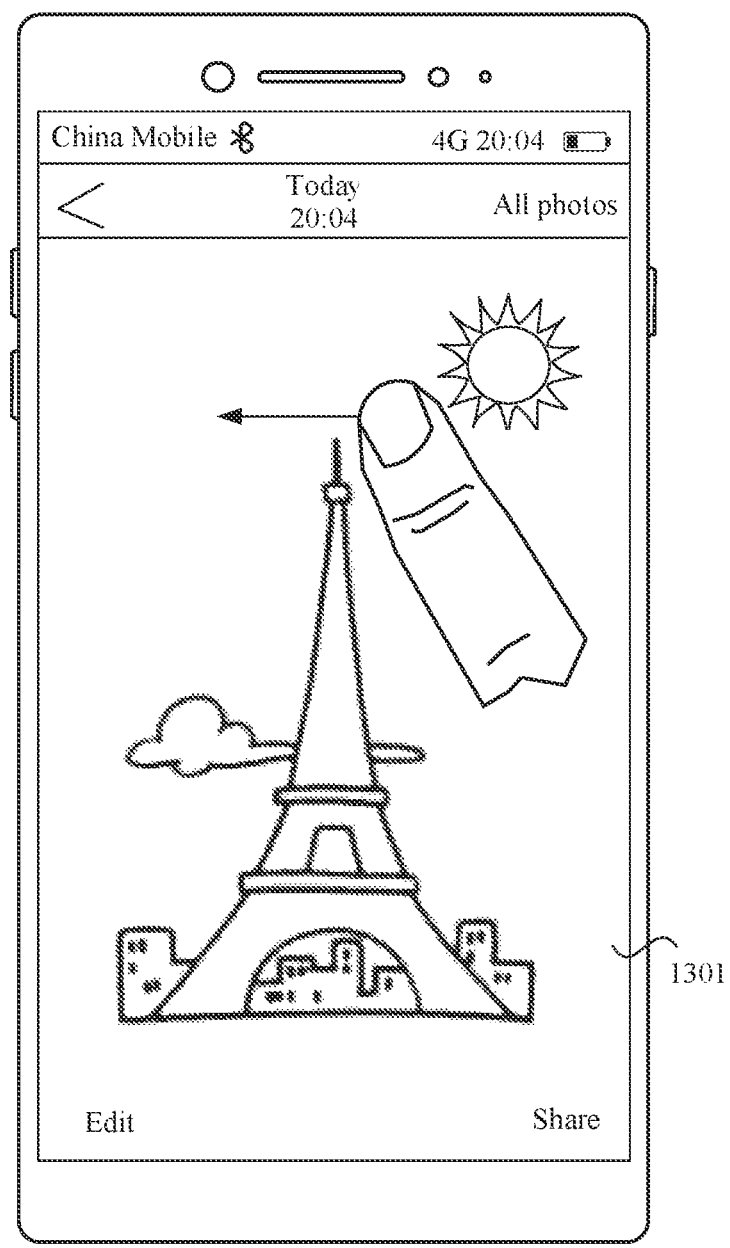
FIG. 16(a) and FIG. 16(b) are a twelfth schematic diagram of a scenario of an electronic device control method according to an embodiment of this application.
Figure 16B:
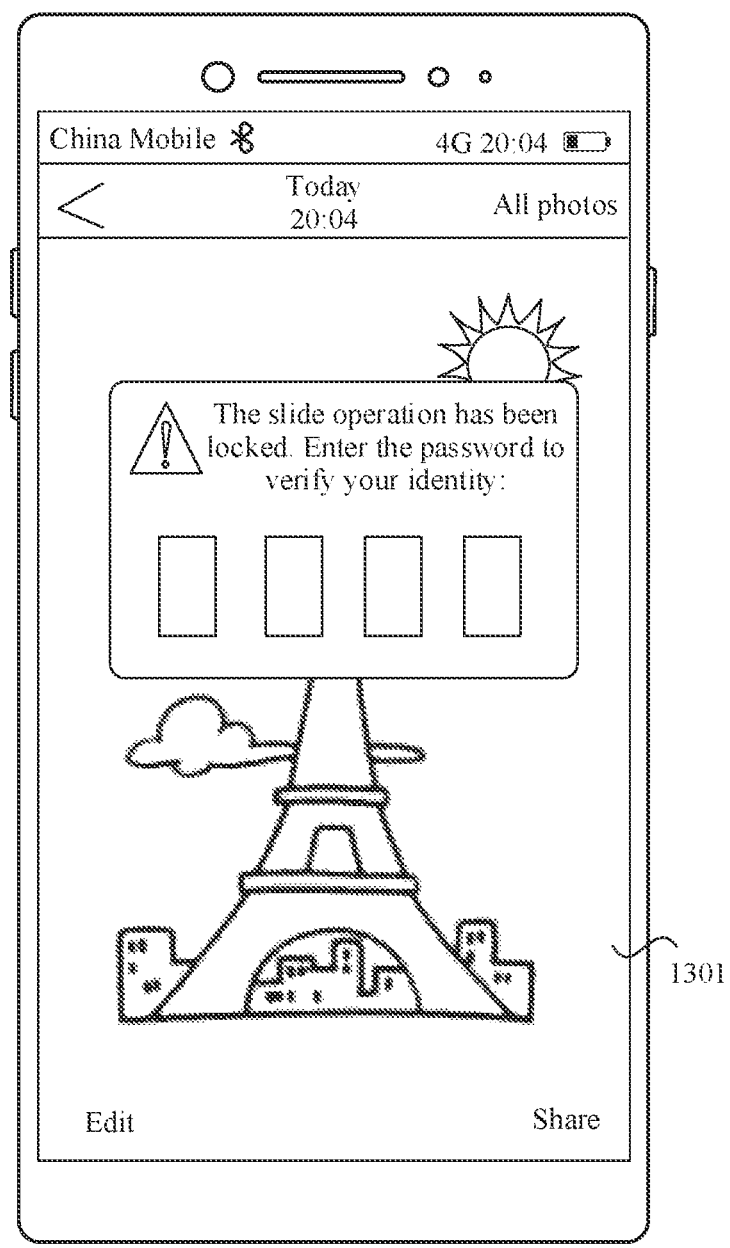

After the mobile phone marks the first operation (for example, the slide operation) as the lock operation, as shown in FIG. 16(*a*), if the mobile phone detects that the user performs the slide operation on the first page (for example, the preview page 1301), the mobile phone may read the flag bit for the slide operation shown in Table 1, to determine that the operation currently performed by the user is a lock operation, that is, an operation that the user does not want another user to perform on the preview page 1301. Therefore, as shown in FIG. 16(*b*), the mobile phone may prompt the user to enter identity authentication information for identity authentication, so as to avoid a problem that privacy content of the user is disclosed because the mobile phone responds to a lock operation that is set by the user when an unauthorized user uses the mobile phone of the user.

For example, the mobile phone may execute the following code to forbid an unauthorized user from performing the slide operation that is set by the user:

```
private void setGestureListener(){
    myView.setOnTouchListener(new OnTouchListener() { //listen to a gesture entered on a touchscreen
        @Override
        public boolean onTouch(View v, MotionEvent event) {
            // TODO Auto-generated method stub
```

```
            switch (event.getAction()) {
            case MotionEvent.ACTION_DOWN:
                mPosX = event.getX();
                mPosY = event.getY();
                break; //detect a DOWN event
            case MotionEvent.ACTION_MOVE:
                mCurPosX = event.getX();
                mCurPosY = event.getY();
                break; //detect a MOVE event
            case MotionEvent.ACTION_UP: break; //detect an UP
event
                if (mCurPosX - mPosX > 0
                    && (Math.abs(mCurPosX - mPosX) > 25))
            { /determine that an operation entered by the user is a slide operation
                        if(needVerify) {//perform identity authentication
when the slide operation is a lock operation
                            if(callForVerify() && isVerified()) {
                                doAction1(); //execute an instruction Action1
corresponding to the slide operation after the identity authentication succeeds
                            } else {
                                return; //otherwise, not respond to the slide
operation
                            }
            });
        }
```

Similar to that in the foregoing embodiment, the identity authentication information that the mobile phone prompts the user to enter may be a digital password, a fingerprint, an iris, a face, a gesture, a pattern password, or the like. This is not limited in the embodiments of this application.

S1205: if the identity authentication information entered by the user is correct, the mobile phone executes a response event corresponding to the first operation.

S1206: If the identity authentication information entered by the user is incorrect, the mobile phone does not respond to the first operation.

In steps S1205 and S1206, the mobile phone compares the identity authentication information entered by the user with preset identity authentication information of an authorized user. If the identity authentication information entered by the user is correct, it indicates that the user who performs a lock operation on the preview page 1301 is an authorized user, and the mobile phone may continue to execute a response event corresponding to the lock operation. For example, the lock operation performed by the user is a slide operation, and the response event corresponding to the slide operation is displaying a next picture in the gallery app. In this case, if the identity authentication information entered by the user is correct, the mobile phone may respond to the slide operation to display a next picture after the picture A.

Correspondingly, if the identity authentication information entered by the user is incorrect, it indicates that the user who performs a lock operation on the preview page 1301 is an unauthorized user. In this case, to prevent the unauthorized user from obtaining information other than the preview page 1301, the mobile phone does not need to respond to the first operation entered by the user. For example, after the application framework layer detects a slide event entered by the user, if the identity authentication information entered by the user is incorrect, the application framework layer may stop reporting the slide event to the gallery app, so that the gallery app cannot respond to the slide event to display a next picture.

Figure 17:
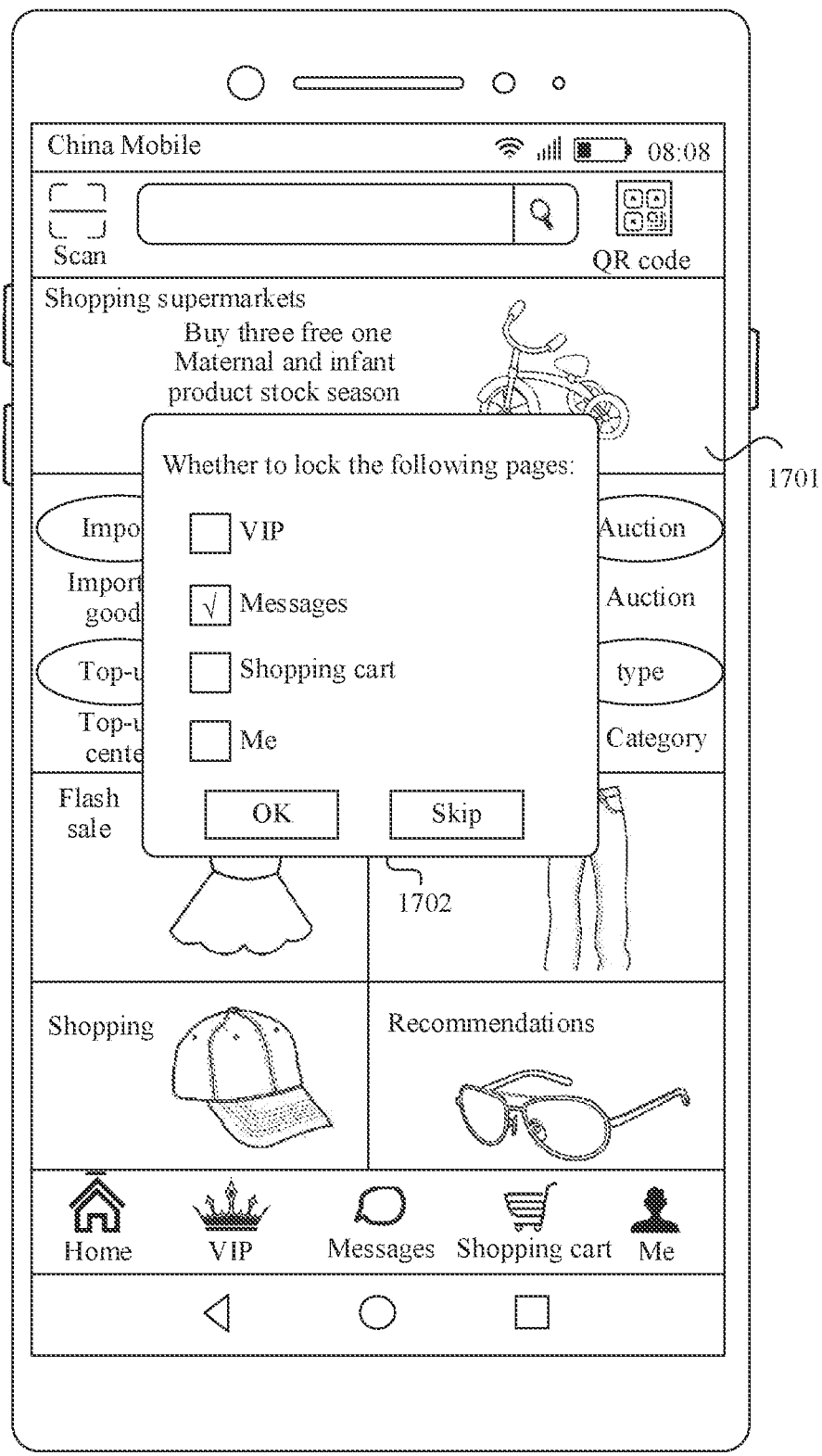
FIG. 17 is a thirteenth schematic diagram of a scenario of an electronic device control method according to an embodiment of this application.

In some other embodiments, when the user sets the first page (or some operations on the first page) that are being displayed on the mobile phone to "locked", the user may further set another display page to "locked". As shown in FIG. 17, the mobile phone locks a home page 1701 of a shopping app when displaying the home page 1701. The shopping app further includes a "VIP" page, a "Messages" page, a "Shopping cart" page, a "Me" page, and the like. In this case, after the user locks the home page 1701, the mobile phone may display a prompt box 1702 to prompt the user whether to set another display page to a locked state. The prompt box 1702 includes four candidate pages: a "(VIP)" page, a "Messages" page, a "Shopping cart" page, and a "Me" page. If the user also sets the message page to a locked state in these candidate pages, when detecting that the user performs an operation of opening the message page, the mobile phone may shield the operation. Alternatively, when detecting that the user performs an operation of opening the message page, the mobile phone may jump to the message page. However, when detecting any, operation entered by the user on the message page, the mobile phone may shield the operation. In this way, when an unauthorized user uses the mobile phone of the user, the mobile phone cannot respond to an operation performed by the unauthorized user on a page locked by the user, thereby improving security and reliability of the mobile phone. Certainly, "Exit the current page" may be set to "locked", to prevent the user from accessing a page other than the current page.

In addition, when a display page (or an operation supported by the display page) in an application is locked by the user, if it is detected that the user performs an operation of killing (kill) the application, the mobile phone may also prompt the user to enter identity authentication information for identity authentication. If the identity authentication information entered by the user is correct, the mobile phone may kill the application. In this way; an unauthorized user can be prevented from re-opening the display page in the application to obtain information in a mobile phone of an authorized user after the unauthorized user kills the application.

For example, after detecting that the user performs an operation of killing (kill) the application, the mobile phone may execute the following code to forbid an unauthorized user from killing the application:

```
void onStop() {//call the onStop function to kill the application
    if(islock) {//if a locked display page exists in the application
        The if(callForVerify() && isVerified()){ //perform identity authentication
on the user
            doStop(); //kill the application after the identity authentication succeeds
        } else {
            return; //otherwise, not respond to the operation of killing the application
by the user
    }
}
```

It can be learned that, in the electronic device control method provided in the embodiments of this application, the user may manually set one or more display pages or some operations on the display page to "locked" based on a requirement of the user. In this way, when the user needs to display, to another user, a display page displayed on the mobile phone, the user may lock the display page according to the foregoing method. In this case, the another user can view only the specified display page, and cannot perform an operation on the display page, thereby preventing information in the mobile phone from being obtained by an unauthorized user. Alternatively, when the user needs to display, to another user, a display page displayed on the mobile phone, the user may customize a lock operation on the display page according to the foregoing method. In this case, the another user cannot perform, on the display page, the lock operation that is set by the user, thereby preventing information in the mobile phone from being obtained by an unauthorized user.

It should be noted that, when the mobile phone displays a display page (for example, the foregoing first page), the mobile phone may provide the user with both a content hiding function 1302 for display content by performing the foregoing steps S301 to S305, and a page locking function 1303 for the display page by performing the foregoing steps S1201 to S1206.

Figure 18:
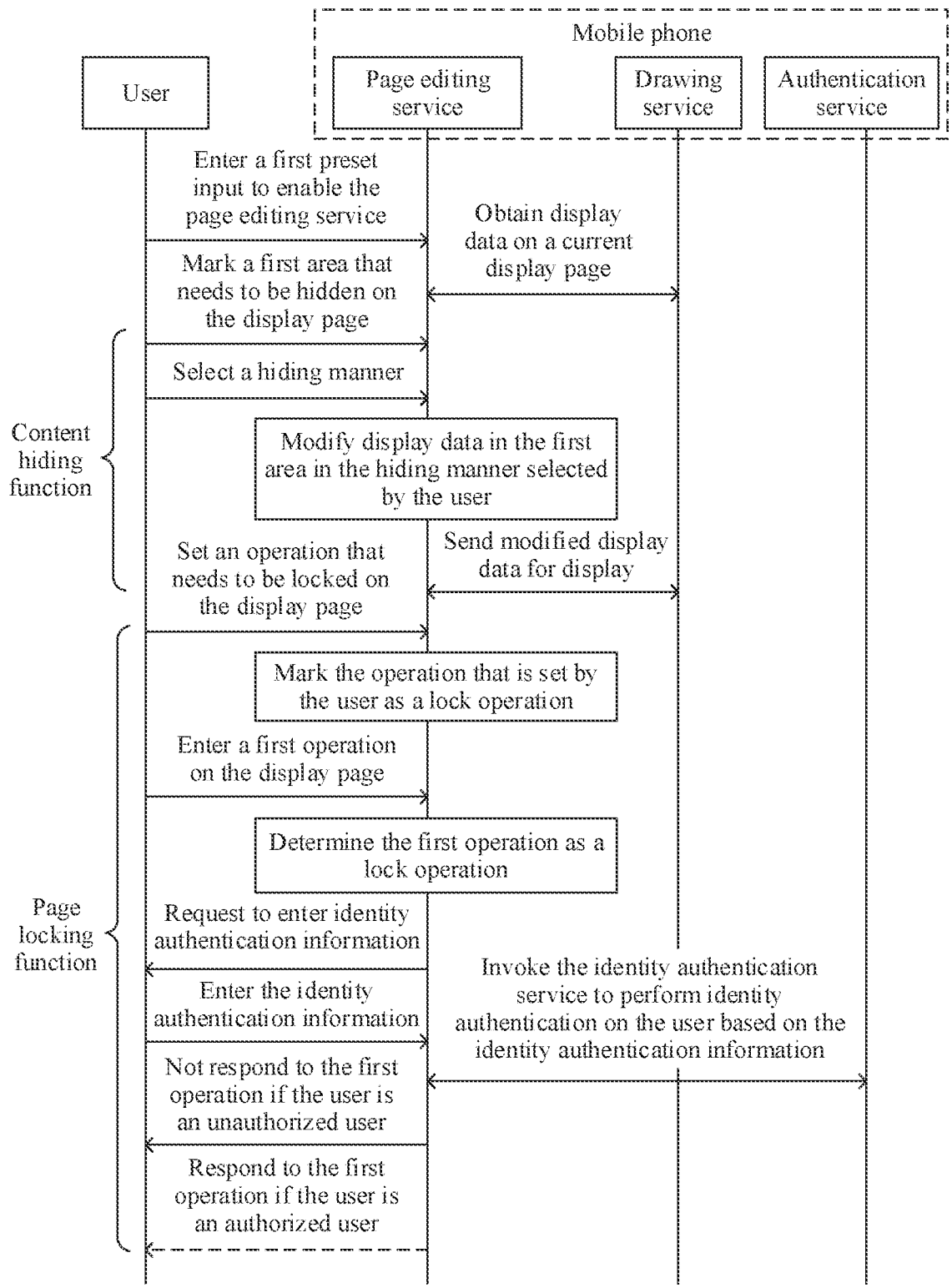
FIG. 18 is a fourteenth schematic diagram of a scenario of an electronic device control method according to an embodiment of this application.

For example, as shown in FIG. 18, when the mobile phone displays a display page, the user may enter the first preset input on the mobile phone. After receiving the first preset input, the mobile phone may enable the page editing service in the mobile phone, so that the page editing service invokes a drawing service to obtain display data on the display page. Further, the mobile phone may prompt the user to mark a first area that needs to be hidden on the display page. After the user marks the first area on the display page, the mobile phone may continue to prompt the user to select a specific hiding manner of hiding display content in the first area, for example, blurring or mosaic. After obtaining the first area marked by the user and the hiding manner selected by the user, the page editing service may modify display data in the first area on the display page in the hiding manner selected by the user. In this way, after the page editing service sends modified display data to the drawing service for display, the actual display data in the first area on the display page is hidden, and the content in the first area marked by the user is prevented from being disclosed.

Further, still as shown in FIG. 18, in addition to the content hiding function, the page editing service may further provide the user with a page locking function. Alternatively, the page editing service may provide only a page locking function. Specifically, (in response to a preset input entered by the user on the mobile phone, or after providing the content hiding function), the mobile phone may prompt the user to set an operation that needs to be locked on the current display page. Further, after the page editing service receives the operation that needs to be locked and that is set by the user, the operation may be marked as a lock operation. For example, a flag bit for a slide operation selected by the user is set to 1. In this case, after any operation entered by the user on the display interface is detected subsequently, the page editing service may determine whether the operation currently entered by the user is the lock operation. If the operation is the lock operation, the page editing service prompts the user to enter identity authentication information for identity authentication. After receiving the identity authentication information entered by the user, the page editing service may invoke an authentication service to perform identity authentication on the user. If the identity authentication fails, it indicates that the user who performs the lock operation is an unauthorized user, and the page editing service does not need to respond to the operation. If the identity authentication succeeds, it indicates that the user who performs the lock operation is an authorized user, and the page editing service may normally respond to the operation. In this way, when using the mobile phone, the unauthorized user cannot obtain sensitive information hidden on the display page, and cannot perform the lock operation on the display page, thereby avoiding disclosure of privacy content of the user, and improving security and stability of the mobile phone.

Figure 19:
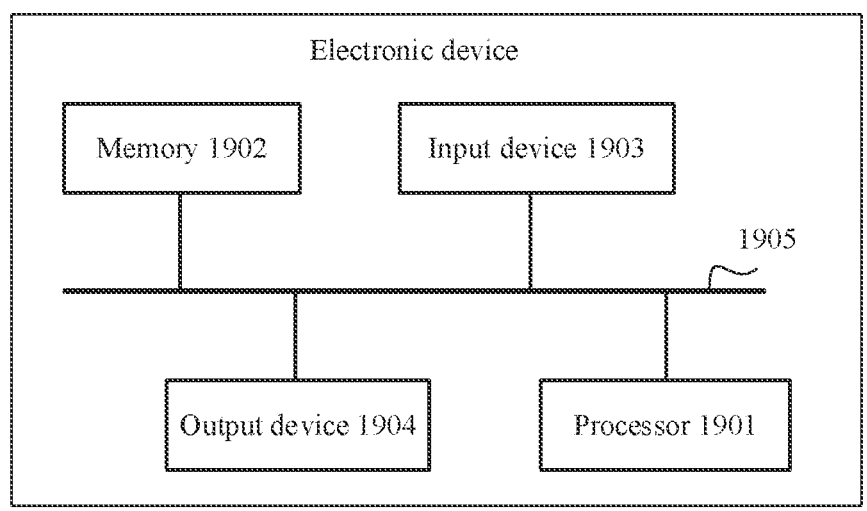
FIG. 19 is a second schematic structural diagram of an electronic device according to an embodiment of this application.

As shown in FIG. 19, an embodiment of this application discloses an electronic device, including a processor 1901, a memory 1902, an input device 1903, and an output device 1904. There may be one or more processors 1901, one or more memories 1902, one or more input devices 1903, and one or more output devices 1904 (an example in which there is one processor 1901, one memory 1902, one input device 1903, and one output device 1904 is used in FIG. 19). The processor 1901, the memory 1902, the input device 1903, and the output device 1904 may communicate with each other by using a bus 1905.

The processor 1901 is configured to control and manage an action of the electronic device. For example, the processor 1901 may be a central processing unit (Central Processing Unit, CPU), a GPU, a digital signal processor (Digital Signal Processor, DSP), an application-specific integrated circuit (Application-Specific Integrated Circuit, ASIC), a field programmable gate array (Field Programmable Gate Array, FPGA) or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors or a combination of the DSP and a microprocessor.

The memory 1902 may include a high-speed random access memory (RAM), and may further include a nonvolatile memory such as a magnetic disk storage device, a flash memory, or another volatile solid-state storage device.

The input device 1903 may be a device such as a touchscreen or a microphone that receives information entered by a user.

The output device 1904 may be a device such as a display that is configured to display information entered by a user, information provided for the user, and various menus of the electronic device. Specifically, the display may be configured in a form of a liquid crystal display, an organic light-emitting diode, or the like. In addition, a touchpad may be further integrated into the display, and is configured to collect a touch event on or near the touchpad, and send collected touch information to another device (for example, a processor).

For example, in this embodiment of this application, the input device 1903 may be configured to support the electronic device in performing steps S301 and S303 shown in FIG. 3 and step S1202 shown in FIG. 13. The output device 1904 may support, under an instruction of the processor 1901, the electronic device in performing steps S302 and S305 shown in FIG. 3 and steps S1201 and S1204 shown in FIG. 13. The processor 1901 may be configured to support the electronic device in performing steps S301, S302, S304, and S305 shown in FIG. 3 and steps S1201 to S1206 shown in FIG. 13, All related content of the steps in the foregoing method embodiments may be cited in function descriptions of corresponding physical devices. Details are not described herein again.

The foregoing descriptions about implementations allow a person skilled in the art to clearly understand that, for the purpose of convenient and brief description, division into only the foregoing function modules is used as an example for description. During actual application, the foregoing functions can be allocated to different function modules for implementation. In other words, an inner structure of an apparatus is divided into different function modules to implement all or some of the functions described above. For a detailed working process of the foregoing system, apparatus, and unit, refer to a corresponding process in the foregoing method embodiments, and details are not described herein again.

Function units in the embodiments of this application may be integrated into one processing unit, or each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the embodiments of this application essentially, or the part contributing to the prior art, or all or some of the technical solutions may be implemented in a form of a software product. The computer software product is stored in a storage medium and includes several instructions for instructing a computer device (which may be a personal computer, a server, or a network device) or a processor to perform all or some of the steps of the methods described in the embodiments of this application. The foregoing storage medium includes: any medium that can store program code, such as a flash memory, a removable hard disk, a read-only memory, a random access memory, a magnetic disk, or an optical disc.

The foregoing descriptions are merely specific implementations of the embodiments of this application, but are not intended to limit the protection scope of the embodiments of this application. Any variation or replacement within the technical scope disclosed in the embodiments of this application shall fall within the protection scope of the embodiments of this application. Therefore, the protection scope of the embodiments of this application shall be subject to the protection scope of the claims.

What is claimed is:

1. A method, comprising:
    displaying a first page of an application;
    receiving, while displaying the first page, a first preset input of a user;
    displaying, in response to receiving the first preset input and while continuing to display the first page of the application, a page locking function and a page content hiding function;
    locking, in response to receiving a first selection of the page locking function, the application on displaying the first page;
    enabling, in response to receiving a second selection of the page content hiding function, the page content hiding function for the first page;
    receiving, after enabling the page content hiding function, a second preset input of marking a hidden area on the first page from the user, wherein the hidden area comprises display content;
    prompting the user to select a hiding manner of the display content, wherein the hiding manner comprises at least one of blurring, mosaic, graffiti, or clearing;
    receiving, from the user, the hiding manner;
    hiding, in response to the second preset input and using the hiding manner, the display content in the hidden area on the first page;
    locking, in response to hiding the display content, the application;
    detecting, in response to an operation to close the application, whether the application is locked; and
    when the application is locked:
        performing, in response to the operation to close the application and the application comprising the hidden area, an identity authentication;
        closing the application when the identity authentication succeeds; and
        not closing the application when the identity authentication does not succeed.

2. The method of claim 1, wherein before receiving the second preset input, the method further comprises prompting the user to mark a first area to be hidden on the first page.

3. The method of claim 1, further comprising:
    obtaining first display data on the first page, wherein the first display data comprises a pixel value of each pixel on the first page; and
    modifying second display data in the hidden area to hide the display content in the hidden area.

4. The method of claim 1, further comprising displaying a mark box on the first page to mark a first area to be hidden on the first page, wherein the second preset input is an operation of adjusting or identifying a size of the mark box or a location of the mark box on the first page.

5. The method of claim 4, wherein the first page further comprises an invert button, and wherein the method further comprises:
    receiving, from the user, a third preset input of marking a non-hidden area on the first page;
    detecting that the invert button has been selected; and identifying, in response to the detecting, the first area other than the non-hidden area on the first page as the hidden area.

6. The method of claim 1, further comprising displaying a toolbar on the first page, wherein the toolbar comprises a tool button, and wherein the second preset input is an operation of marking, using the tool button, the hidden area on the first page.

7. The method of claim 1, wherein after hiding the display content, the method further comprises:
receiving, from the user, identity authentication information;
identifying that the identity authentication information is correct; and
redisplaying, in response to the identifying, the display content in the hidden area on the first page.

8. The method of claim 1, wherein after hiding the display content, the method further comprises:
receiving, from the user, a setting of locking a first operation on the first page;
detecting that the user has performed the first operation on the first page;
prompting, in response to the detecting, the user to enter identity authentication information;
receiving, from the user, the identity authentication information;
executing a response event corresponding to the first operation when the identity authentication information is correct; and
skipping responding to the first operation when the identity authentication information is incorrect.

9. The method of claim 1, wherein the first preset input comprises a press operation from the user on the first page of the application, wherein displaying the page locking function and the page content hiding function comprises displaying text on the first page instructing the user to select an operation to be performed on the first page of the application, a first user interface element comprising text indicating the page locking function, and a second user interface element comprising text indicating the page content hiding function, and wherein the first page, the first user interface element, and the second user interface element are displayed simultaneously.

10. An apparatus, comprising:
an input device;
an output device; and
one or more processors coupled to the input device and the output device and configured to:
display, using the output device, a first page of an application;
receive, using the input device, first input information of a user;
identify the first input information as a first preset input;
display, in response to receiving the first preset input and while continuing to display the first page of the application, a page locking function and a page content hiding function;
lock, in response to receiving a first selection of the page locking function, the application on displaying the first page;
enable, in response to receiving a second selection of the page content hiding function, the page content hiding function for the first page;
receive, after enabling the page content hiding function and using the input device, second input information of the user;
identify the second input information as a second preset input of marking a hidden area on the first page, wherein the hidden area comprises display content;
hide, using the output device and in response to the second preset input, the display content in the hidden area;
prompt, using the output device, the user to select a hiding manner of the display content in the hidden area, wherein the hiding manner comprises at least one of blurring, mosaic, graffiti, or clearing;
receive, from the user using the input device, the hiding manner;
hide, using the output device and using the hiding manner, the display content in the hidden area on the first page;
lock, in response to hiding the display content, the application;
detect, in response to an operation to close the application, whether the application is locked; and
when the application is locked:
perform, in response to the operation to close the application and the application comprising the hidden area, an identity authentication;
close the application when the identity authentication succeeds; and
not close the application when the identity authentication does not succeed.

11. The apparatus of claim 10, wherein the one or more processors are further configured to prompt, using the output device, the user to mark a first area to be hidden on the first page.

12. The apparatus of claim 10, wherein the one or more processors are further configured to:
obtain first display data on the first page, wherein the first display data comprises a pixel value of each pixel on the first page; and
modify, in response to the second preset input, second display data in the hidden area to display, using the output device, modified display data.

13. The apparatus of claim 10, wherein the one or more processors are further configured to display, using the output device, a mark box on the first page to mark a first area to be hidden, and wherein the second preset input is an operation of adjusting or identifying a size of the mark box or a location of the mark box on the first page.

14. The apparatus of claim 13, wherein the first page further comprises an invert button, and wherein the one or more processors are further configured to:
receive, from the user and using the input device, a third preset input of marking a non-hidden area on the first page;
detect that the invert button is selected; and
identify the first area other than the non-hidden area on the first page as the hidden area.

15. The apparatus of claim 10, wherein the one or more processors are further configured to display, using the output device, a toolbar on the first page, wherein the toolbar comprises a tool button, and wherein the second preset input is an operation of marking the hidden area on the first page using the tool button.

16. The apparatus of claim 10, wherein the one or more processors are further configured to:
receive, from the user and using the input device, identity authentication information;
identify that the identity authentication information is correct; and redisplay, using the output device, the display content in the hidden area on the first page.

17. The apparatus of claim 10, wherein the one or more processors are further configured to:
receive, from the user using the input device, a setting of locking a first operation on the first page;
detect that the user performs the first operation on the first page;
prompt, using the output device, the user to enter identity authentication information;
receive, from the user using the input device, the identity authentication information;
execute a response event corresponding to the first operation when the identity authentication information is correct; and
skip responding to the first operation when the identity authentication information is incorrect.

18. An apparatus, comprising:
a memory configured to store instructions; and
one or more processors coupled to the memory and configured to execute the instructions to:
display a first page of an application;
receive, while displaying the first page, a first preset input of a user;
display, in response to receiving the first preset input and while continuing to display the first page of the application, a page locking function and a page content hiding function;
lock, in response to receiving a first selection of the page locking function, the application on displaying the first page;
enable, in response to receiving a second selection of the page content hiding function, the page content hiding function for the first page;
receive, after enabling the page content hiding function, a second preset input of marking a hidden area on the first page from the user, wherein the hidden area comprises display content;
prompt the user to select a hiding manner of the display content, wherein the hiding manner comprises at least one of blurring, mosaic, graffiti, or clearing;
receive, from the user, the hiding manner;
hide, in response to the second preset input and using the hiding manner, the display content in the hidden area on the first page;
lock, in response to hiding the display content, the application;
detect, in response to an operation to close the application, whether the application is locked; and
when the application is locked:
perform, in response to the operation to close the application and the application comprising the hidden area, an identity authentication;
close the application when the identity authentication succeeds; and
not close the application when the identity authentication does not succeed.

19. The apparatus of claim 18, wherein the one or more processors are further configured to execute the instructions to:
obtain first display data on the first page, wherein the first display data comprises a pixel value of each pixel on the first page; and
modify second display data in the hidden area to hide the display content in the hidden area.

20. The apparatus of claim 18, wherein the one or more processors are further configured to execute the instructions to display a mark box on the first page to mark a first area to be hidden on the first page, and wherein the second preset input is an operation of adjusting or identifying a size of the mark box or a location of the mark box on the first page.

* * * * *